Figure 1:
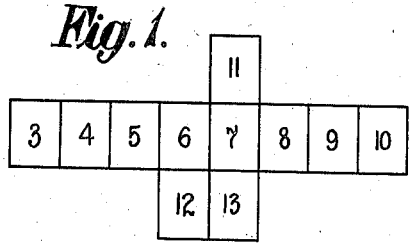

Jan. 5, 1937.  L. M. SIMPSON  2,066,698
ELECTRIC TOTALIZER
Filed Feb. 21, 1930   13 Sheets-Sheet 1

Inventor
Lancelot Martin Simpson
Atty.

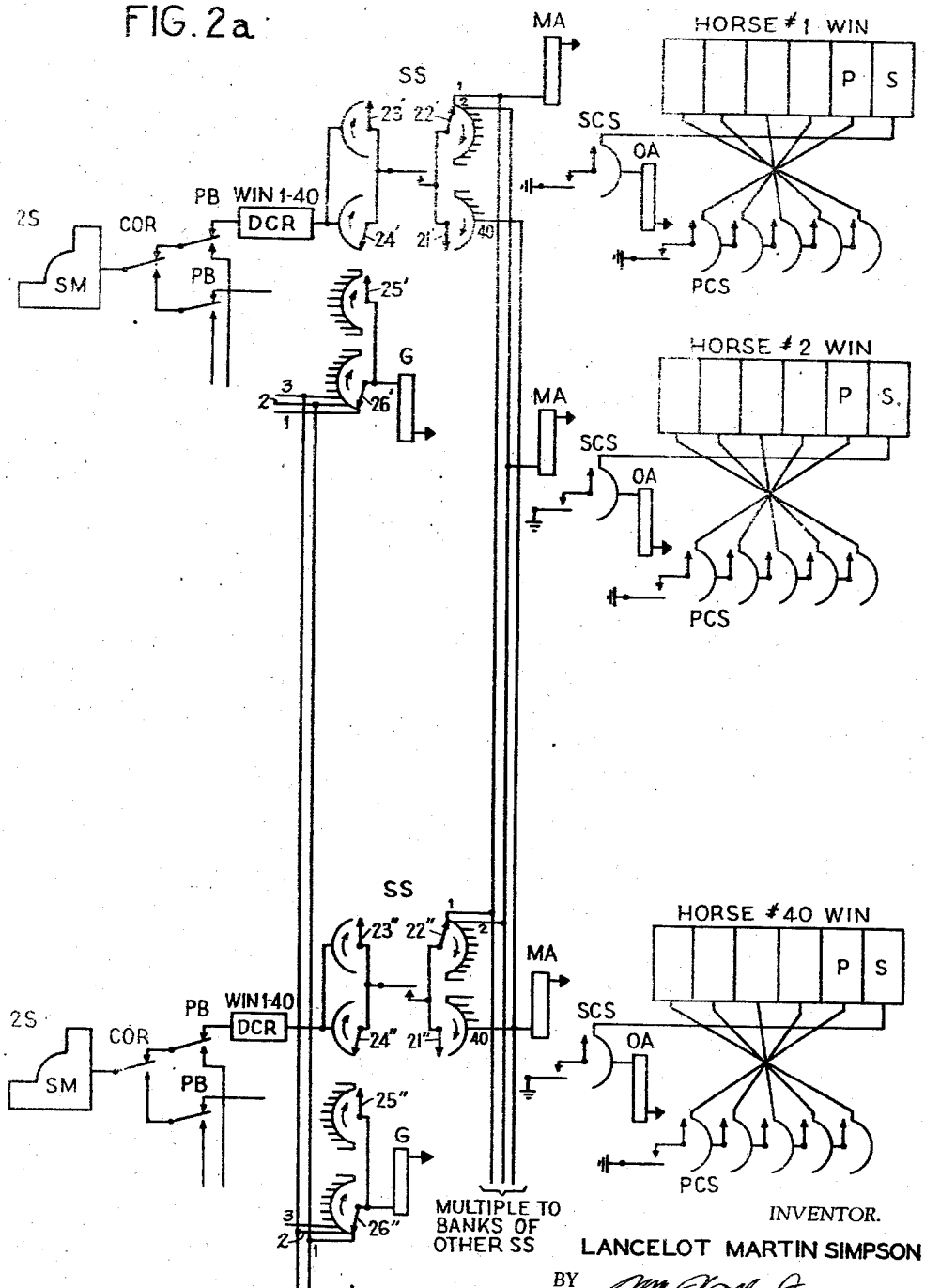

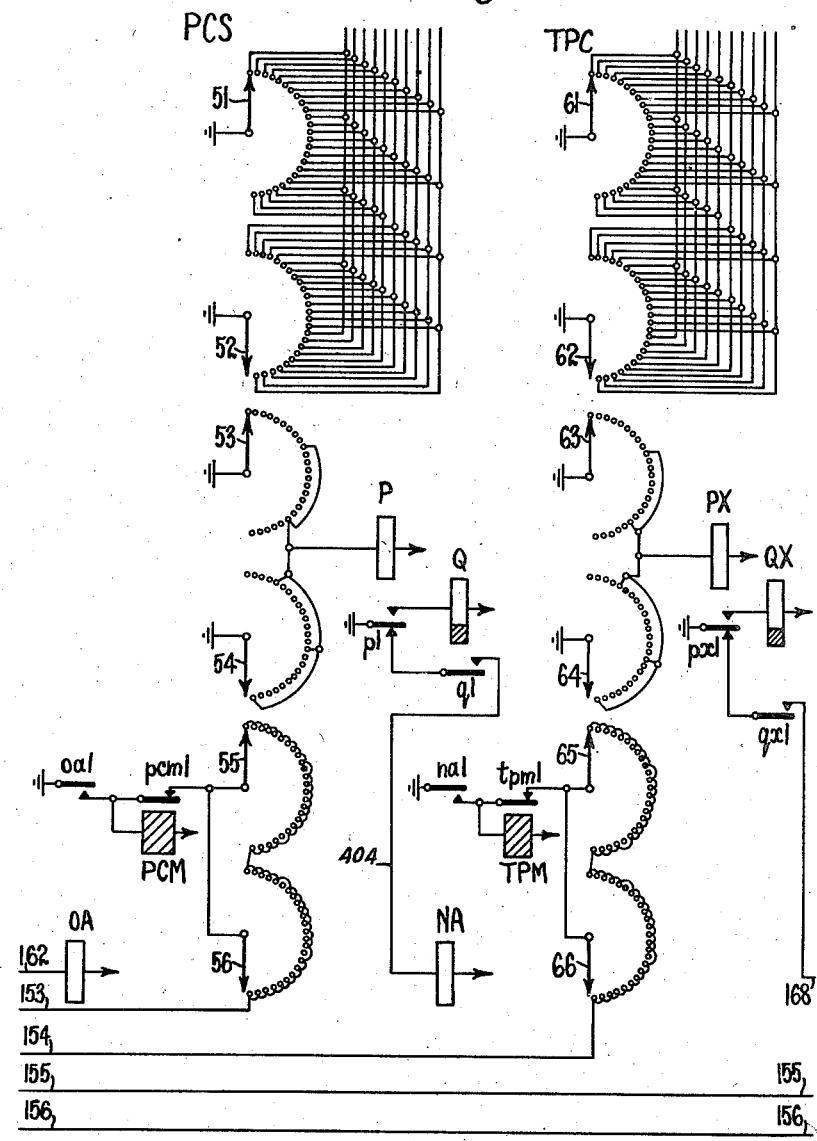

Patented Jan. 5, 1937

2,066,698

UNITED STATES PATENT OFFICE 2,066,698

ELECTRIC TOTALIZER

Lancelot Martin Simpson, Thorner, England, assignor to Automatic Electric Company Limited, Liverpool, England, a British company Application February 21, 1930, Serial No. 430,414
In Great Britain March 28, 1929

41 Claims. (Cl. 235—92)

The present invention relates to electric totalizers and is particularly concerned with arrangements for adding indications which may be of various characters and which are received from a plurality of sending stations which may be located at various points at a distance and which may initiate signals at any time in relation to one another. The arrangement according to the invention is particularly suitable for use on racecourses with mechanical betting facilities where the issue of tickets which may be of different denominations from a plurality of machines located in various parts of the course is required to operate registering equipment comprising one or more indicators preferably located at some central point to show the total amount which has been invested on any particular runner and also the aggregate for the race. It is very desirable on apparatus of this character that the totalizing action shall be effected very rapidly, while at the same time it is also important that the machinery shall not be unduly complicated, shall be easy to maintain and shall respond reliably and accurately, no matter how fast the ticket-issuing machines are operated or how many are operated simultaneously. It is the chief object of the invention to meet these requirements by the use in the registering equipment of automatic switches of the type used in telephone systems.

According to one feature of the invention, indications of various characters from each ticket-issuing machine are transmitted to the central equipment by the connection of potential to various combinations of a group of leads considerably less in number than the number of possible indications.

According to another feature of the invention, the printing and issuing of the ticket corresponding to the setting operation of a ticket-issuing machine is initiated due to current flow from the totalizing equipment indicating that the bet has been properly registered.

A further feature of the invention is that indications of various characters from a plurality of ticket-issuing machines are collected by rotating switches which sweep over contacts associated with the various indications which are marked over the contacts of discriminating relay groups to which the indications are transmitted from the ticket-issuing machines.

Still another feature of the invention is that in an electric totalizer of the type having indications of various characters transmitted from ticket-issuing machines and collected by rotating switches and having ticket-issuing machines adapted to issue tickets of different values, the collecting switches associated with thicket-issuing machines of higher value are arranged to have their effective collecting movement interrupted at predetermined intervals in order to permit the transfer to the associated totalizing equipment of indications corresponding to the issue of a predetermined number of tickets of lower value.

Figure 2:
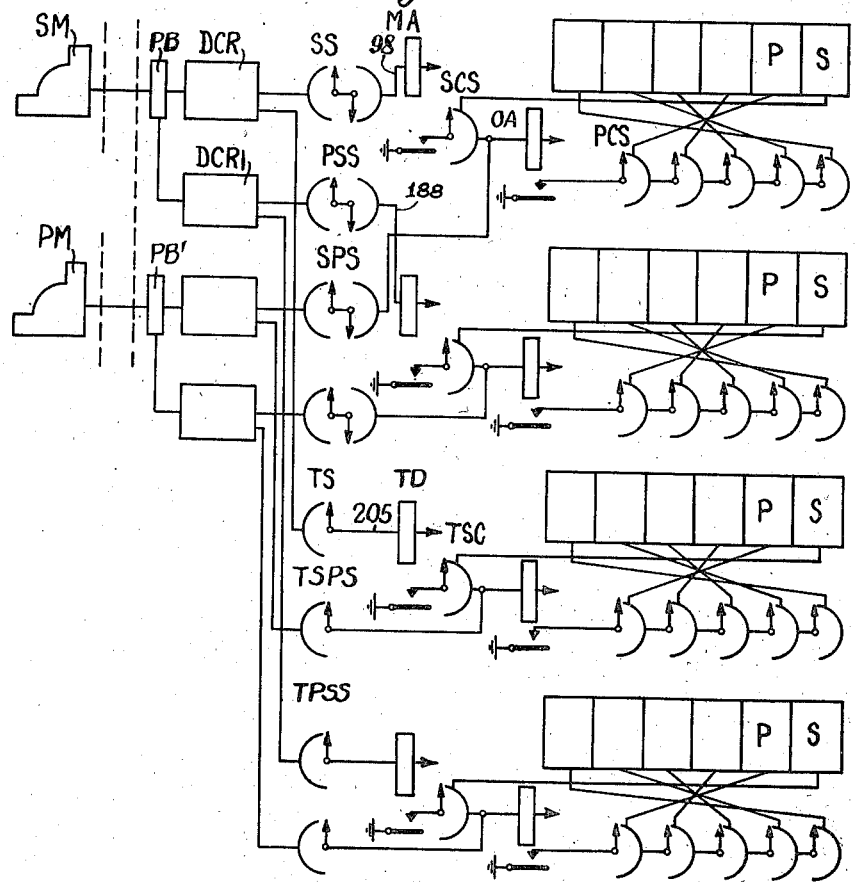
Figure 14:
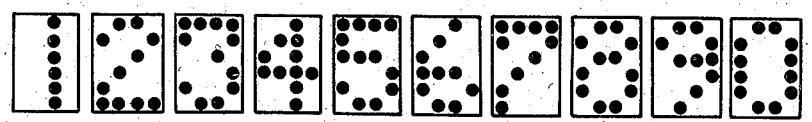
Figure 10:
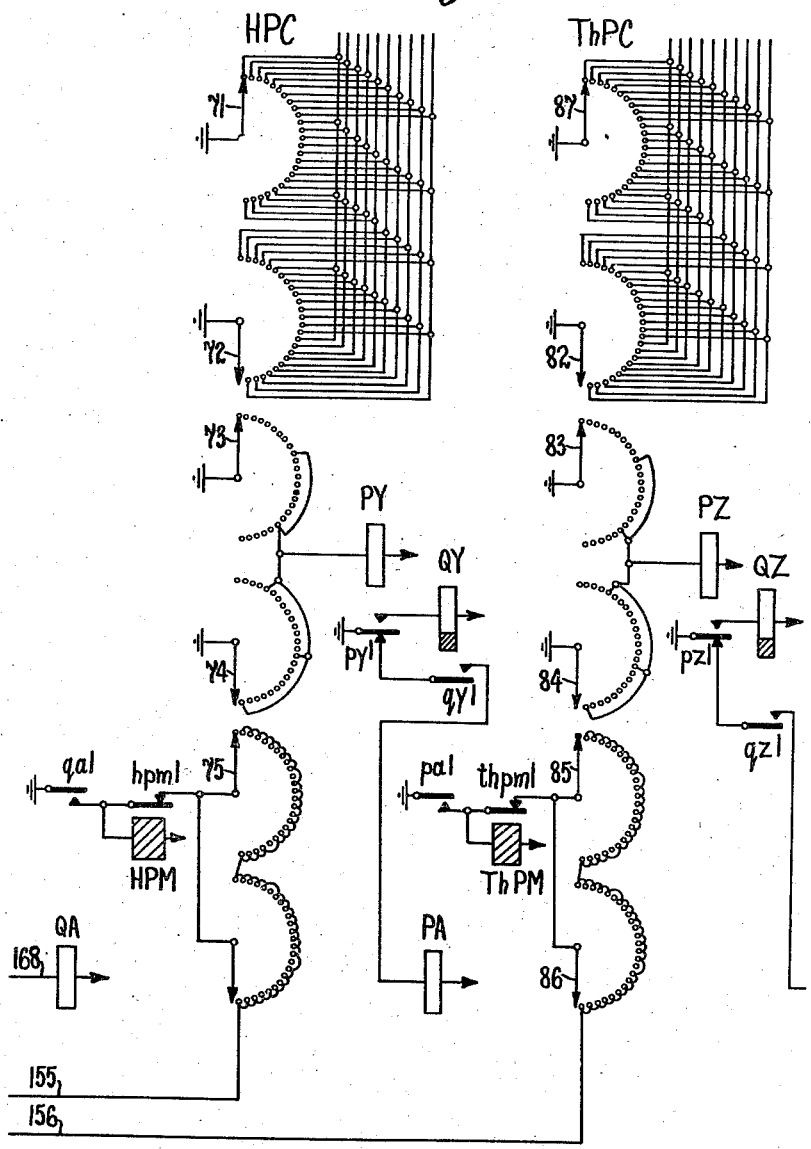

These features of the invention and others not specifically mentioned at this point will be better understood from the following description of one method of carrying it into effect which is given by way of example and should be taken in conjunction with the accompanying drawings comprising Figs. 1–14. Of these, Figs. 2 and 2a show the general layout of the system, Fig. 1 shows how Figures 3–13 illustrating the detailed circuits should be fitted together and Fig. 14 shows the appearance of the monogram type indicator lamps. For convenience of description it will be assumed that the installation is applied to a course on which horse racing takes place. It should be mentioned also that as a matter of convenience one pole of the operating battery has been represented by an arrow lead while the other pole has been represented by an earth symbol. It is, however, by no means essential that one pole of the battery should be earthed. Also, the number of separate batteries employed will depend on actual requirements. In the system described, however, it is visualized that all the equipment shall work at a voltage of the order of 50 volts with the exception of the indicating lamps which may be run from a public supply at 230 volts.

The general layout of the system will first be considered, reference being had to Fig. 2. This shows a 2/- ticket issuing machine SM and a £1 machine PM and it will be understood that these machines will be provided in quantities to suit the anticipated business depending on the size of the course. In addition, a suitable number of £10 ticket issuing machines may be provided and, if there is likely to be any demand for them, £100 ticket-issuing machines also, though only 2/- and £1 machines have been assumed in the system which is described in detail hereinafter. All the machines are designed to cater for a maximum of 80 horses and both win and place betting, the totalizing or registering equipment for the two classes of bets being entirely separate. Fig. 2 also shows the win and place indicators for a single horse and also the win and place total indicators.

Assuming that the operator at the 2/- ticket-issuing machine SM illustrated in Fig. 2 receives a request for a 2/-investment for a win on horse No. 1, he will operate the "win" key and also the appropriate horse key on the ticket machine. By this means a rotary switch mechanism incorporated in the ticket machine SM is caused to rotate to take up a position corresponding to the key depressed whereupon a signal is transmitted in code over the leads extending to the totalizing equipment in order to operate the decoding relay group DCR in accordance with the code for horse No. 1. When this operation has been effected, ordinarily in a small fraction of a second, a lamp associated with horse No. 1 is lighted at the ticket machine SM and the operator then presses the 2/- value key in order to prepare the machine for the reception of a signal from the totalizing equipment which will set in operation the mechanism for issuing the ticket. The machine in question is provided with nine value keys, marked 2/-, 4/-, 6/-, 8/-, 10/-, 12/-, 14/-, 16/- and 18/- respectively, and upon the operation of any one of these keys the corresponding number of similar tickets is issued in response to a single operation of the horse and "win" or "place" keys. This arrangement speeds up the operation by avoiding the necessity for re-operating the horse key and the "win" or "place" key for each ticket it is desired to issue. Considering now the decoding relay group, the operation of the relays therein in various combinations effects marking in the banks of a collecting switch SS of which there is one per ticket-issuing machine for collecting win bets, and which is arranged to be in operation continuously during the whole of the betting period. When the left-hand wiper of the switch SS associated with the machine SM encounters the marking produced by DCR on a particular bank contact, a circuit is completed over the right-hand wiper and conductor 98 to operate relay MA to effect the stepping of the 2/- counting switch SCS associated with the win register for horse No. 1 which controls the display on the shillings panel. At the same time a marking is also extended from the decoding relay group DCR to the banks of another collecting switch TS associated with the total win indicator which is similarly in continuous operation during the betting period. Hence a similar signal is transmitted over conductor 205 to operate relay TD which steps the magnet of the 2/- counting switch TSC of the total win indicator which receives the same signal from the machine SM irrespective of the particular horse on which the bet was made. When the signal transmitted to the horse "register" equipment has been duly registered, a signal is transmitted back over a special lead to the ticket-issuing machine SM to initiate the operation of the ticket-issuing mechanism at this machine and also the issue of further tickets is prevented unless the total win indicator has been properly operated. In case the 4/-value key is depressed, then upon the issue of the first ticket, the keys are not released and a further indication is transmitted automatically to the totalizing equipment in a similar manner to that already described, and a second 2/- ticket is issued whereupon the keys and mechanism thereat are restored to normal and the machine is ready for issuing further tickets on the same or other horses.

The ticket issued by the ticket-issuing machine is conveniently printed with certain details irrespective of any selection on the part of the operator, these details including, for instance, the date, the name of the course, the number of the machine, the value of the stake and possibly a serial number or code word as necessary to prevent fraudulent use, while the printing effected under the control of the operator includes the horse number and the word "win" or "place" depending upon the setting of an oscillating pallet which is positioned under the control the "win" and "place" keys, in the manner shown and described in British Patent No. 339,278.

In case the bet had been for a place instead of a win, the place key would have been operated instead of the win key thereby effecting the operation of the switching relay PB at the totalizing equipment which would transfer all the code leads extending from the ticket issuing machine on to another decoding relay group DCR'. This would effect an appropriate marking in the bank of a separable collecting switch PSS which would then extend the signal over a lead such as 188 (Fig. 2) to another indicator or registering equipment associated with horse No. 1 on which all place bets would be indicated. Similarly a marking is also extended to the bank contacts of the place total 2/- collecting switch TPSS which would effect the transmission of a similar signal to the total place indicating equipment shown.

Assume now that a request is made to the operator of the £1 ticket-issuing machine PM for a £1 bet for a win on horse No. 1, he will operate the win key and appropriate horse key of his machine and also the £1 value key, whereupon a similar code will be extended over the control leads to a decoding group in the totalizing equipment associated with that machine. The collecting switch SPS which is in continuous operation during the betting period in due course picks up the marking on its bank contact and operates relay OA which controls the £1 counting switch PCS of the win register equipment for horse No. 1 so that the wipers of this switch are advanced one step in order to register the £1 bet and effect the display of the appropriate number on the indicator. At the same time a similar marking is effected in the bank of the £1 collecting switch TSPS associated with the win total indicator in order to effect the stepping of the £1 counting switch therein. When the bet has been duly registered, a signal is transmitted back to the ticket-issuing machine PM in order to permit the issuing operation of the mechanism. Similarly, as in the case of the 2/- ticket-issuing machine, if the request had been for a place bet then the place key would have been operated instead of the win key thereby effecting the energization of the switching relay PB' in order to transfer the coded signal to a decoding relay group associated with the £1 place indicator.

When the 2/- counting switch SCS of any of the indicators has made ten steps thereby registering ten separate 2/- bets, a circuit is completed for the relay OA which controls the magnet of the associated £1 counting switch PCS in order to add £1 to the total and during this period the signals which are normally transmitted from £1 ticket-issuing machines direct to the £1 counting switch are momentarily suspended so that it will not be possible for the signals from the two sources to overlap and thereby produce faulty registration.

Fig. 2 and the above description concern only the operation of 2/- and £1 ticket-issuing machines, and it will be understood that where £10 machines and £100 machines are also provided their operation is substantially similar to that described for the 2/- and £1 machines, the registrations from these higher value machines being taken of course direct to the counting switches of appropriate value. Here again during the transference of an accumulation of ten £1 indications to the £10 counting switch the normal direct operation of this switch by impulses from £10 machines is suspended in order to obviate any mutilation or overlapping of the signals from the direct source and the indirect source.

As pointed out above there will be a plurality of 2/ ticket issuing machines and also a plurality of £1 ticket issuing machines as well as a plurality of machines of each other decimal order which issue tickets of greater decimally related values. There will also be a win registering equipment for each competitor each comprising a shilling register, a £1 register, and £10 register, a £100 register, a £1000 register, and as many others of greater decimal value as desired. There is also a place registering equipment for each competitor comprising a like number of decimally related registers. There is also one win total registering equipment and one place total registering equipment each again comprising a like number of decimally related registers.

Figure 7:
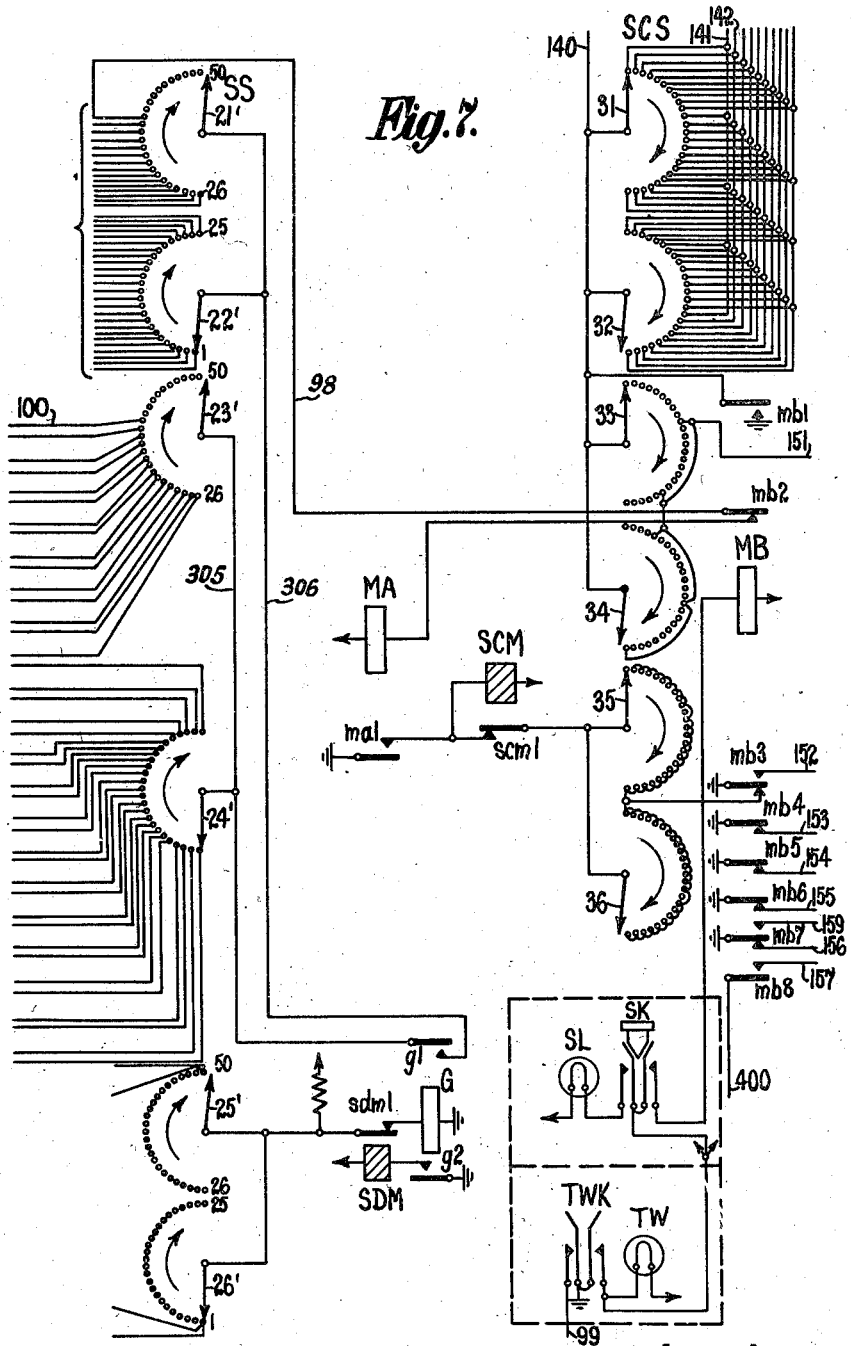
Figure 11:
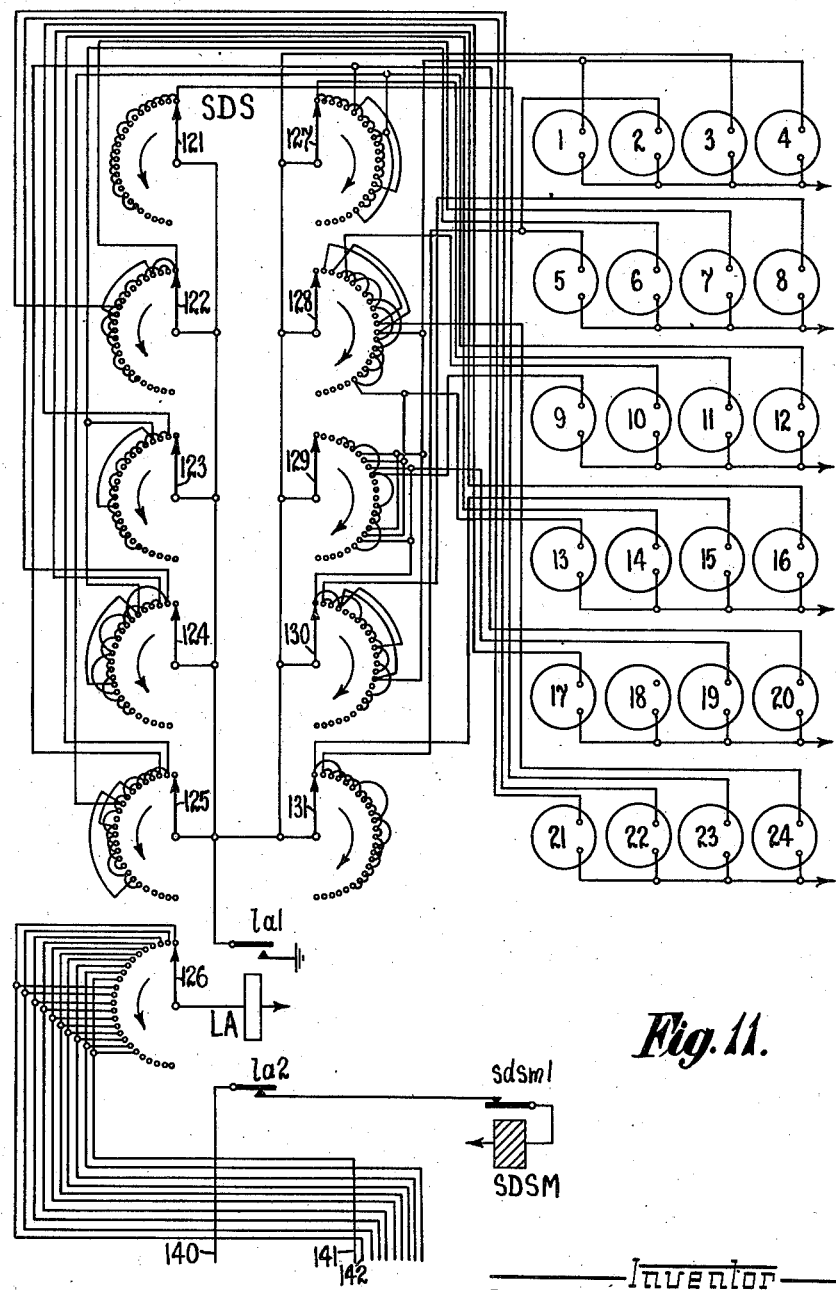
Figure 12:
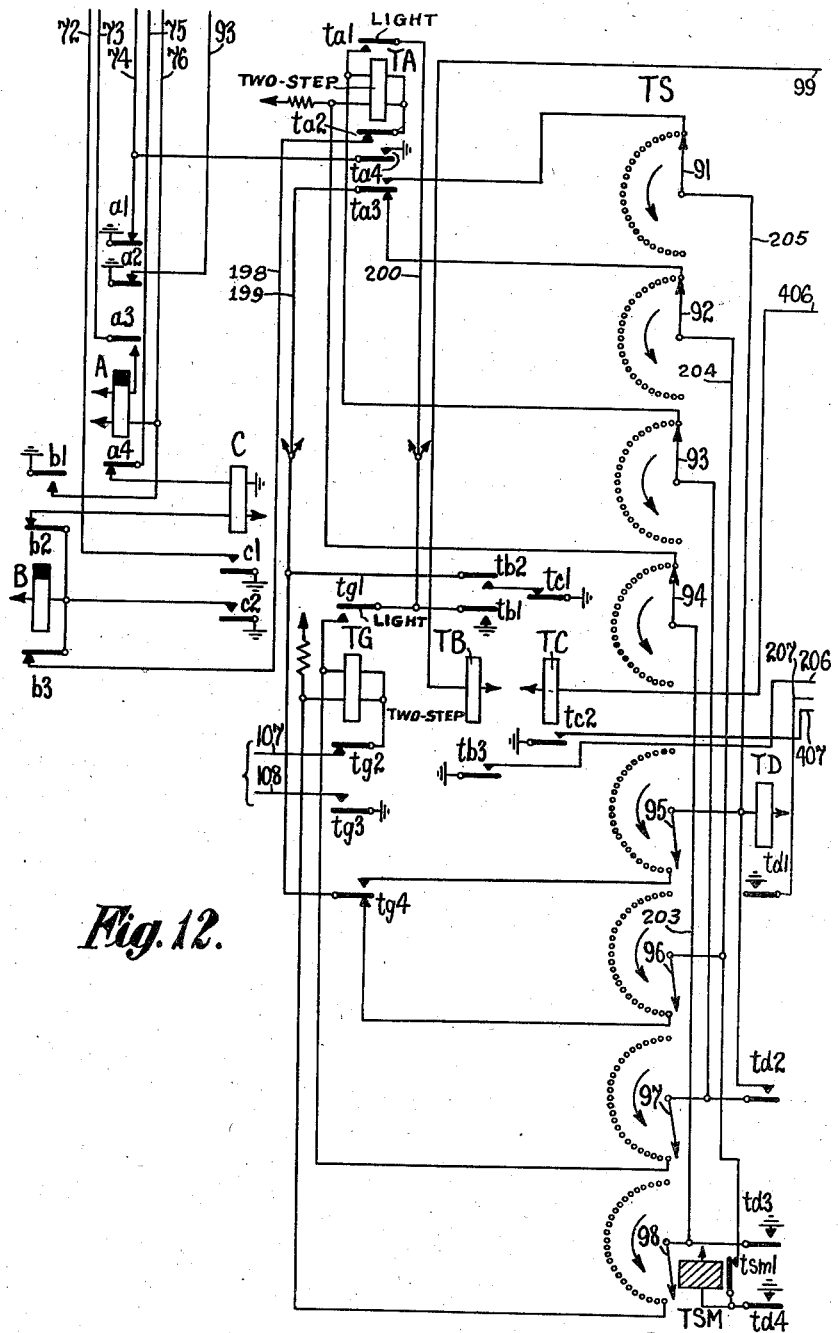
Figure 13:
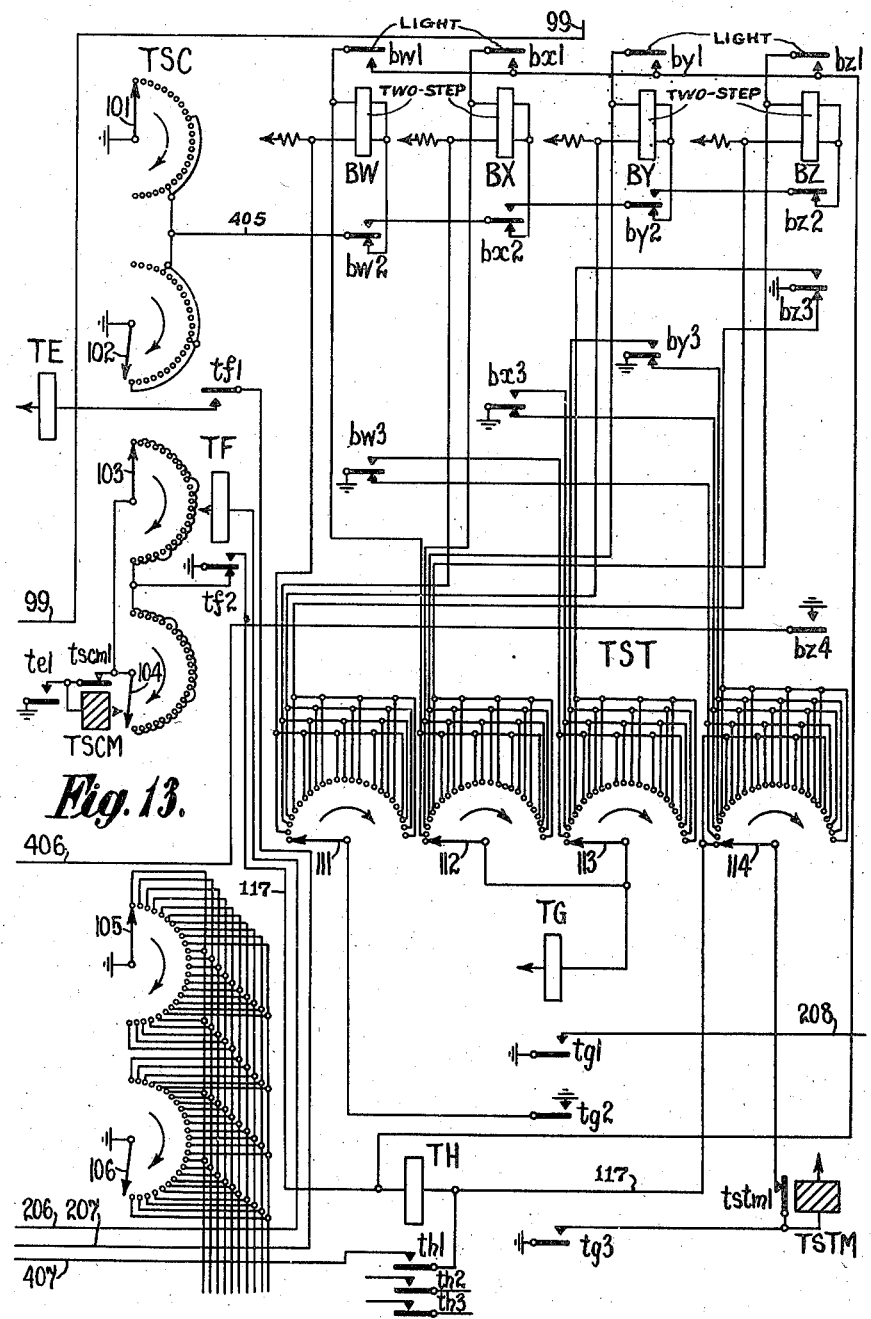

Each of the shilling registers, which form a part of the competitor registering equipment, comprises the bank of indicators such as shown in Fig. 11, a display switch such as SDS shown in the same figure, a counting switch such as SCS shown in Fig. 7, and a start relay such as MA (Fig. 7). Each of the win and place total registering equipments includes a collecting switch TS, a group of relays, a counting switch TSC and indicator controlled thereby, and a £1, £10, £100, and £1000 register similar to those in the registering equipment for each competitor. Such a register equipment is shown in Figs. 12 and 13. Thus in the example here used there will be 80 win registering equipments one for each competitor, each comprising a register for each decimal order, 80 place registering equipments of the same type, 1 win total register equipment and one place total registering equipment each also including 1 register for each decimal order.

Fig. 2a is a diagram showing the connection of two 2/ ticket machines with their collecting switches to two registering equipments more clearly illustrating the manner in which the collecting switches connect the ticket issuing machines of one decimal order successively to the registering equipment. It shows how banks of wipers 25' and 26' of collecting switches SS are connected by a so-called slip multiple, while banks of wipers 23' and 24' and also of wipers 21' and 22' are connected in a straight multiple. Thus the first switch SS connects the #1 lead from the relay group DCR to the registering equipment of the #1 competitor, while the second switch SS has its wipers in second position to connect the #2 lead from its relay group DCR to the registering equipment of the #2 competitor, etc. This operation is controlled by a control switch not shown which successively grounds the leads 1 to 25 in the banks of wipers 25' and 26'. The £1 collecting switches are similarly controlled as are the place collecting switches.

Figure 3:
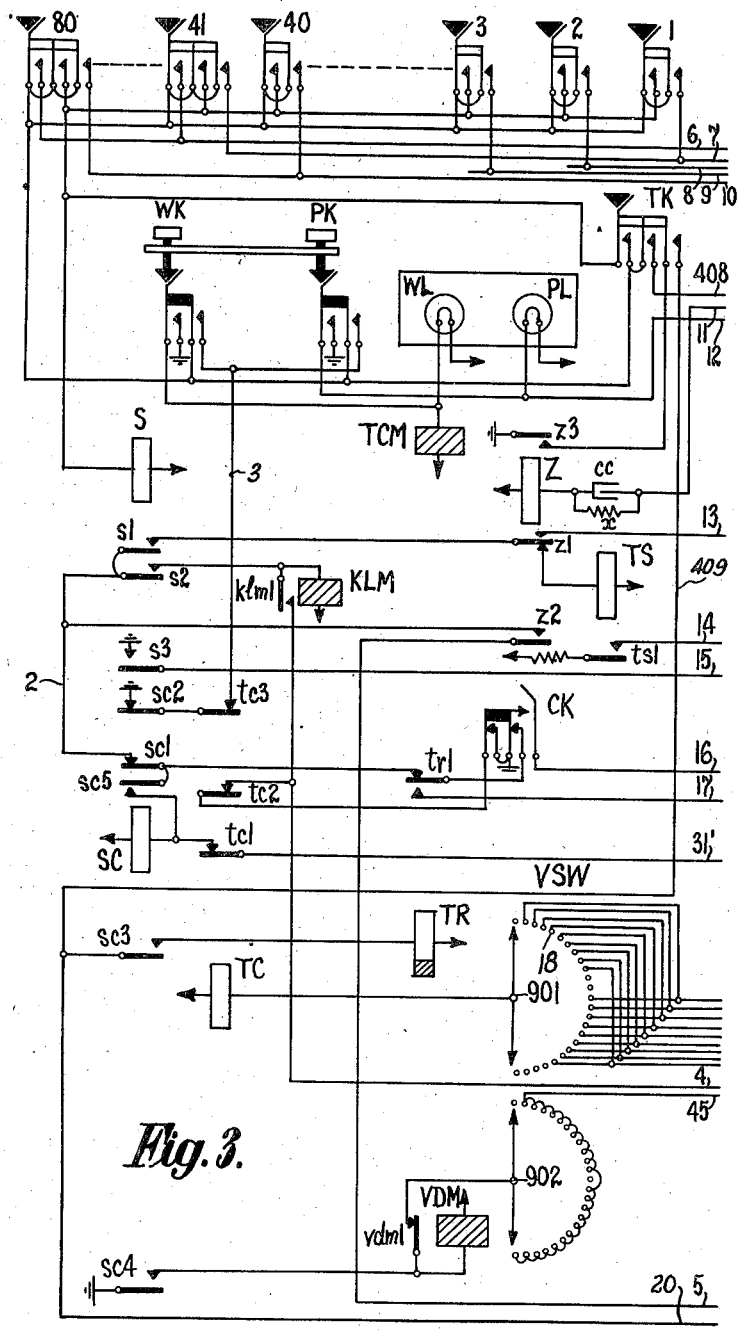
Figure 4:
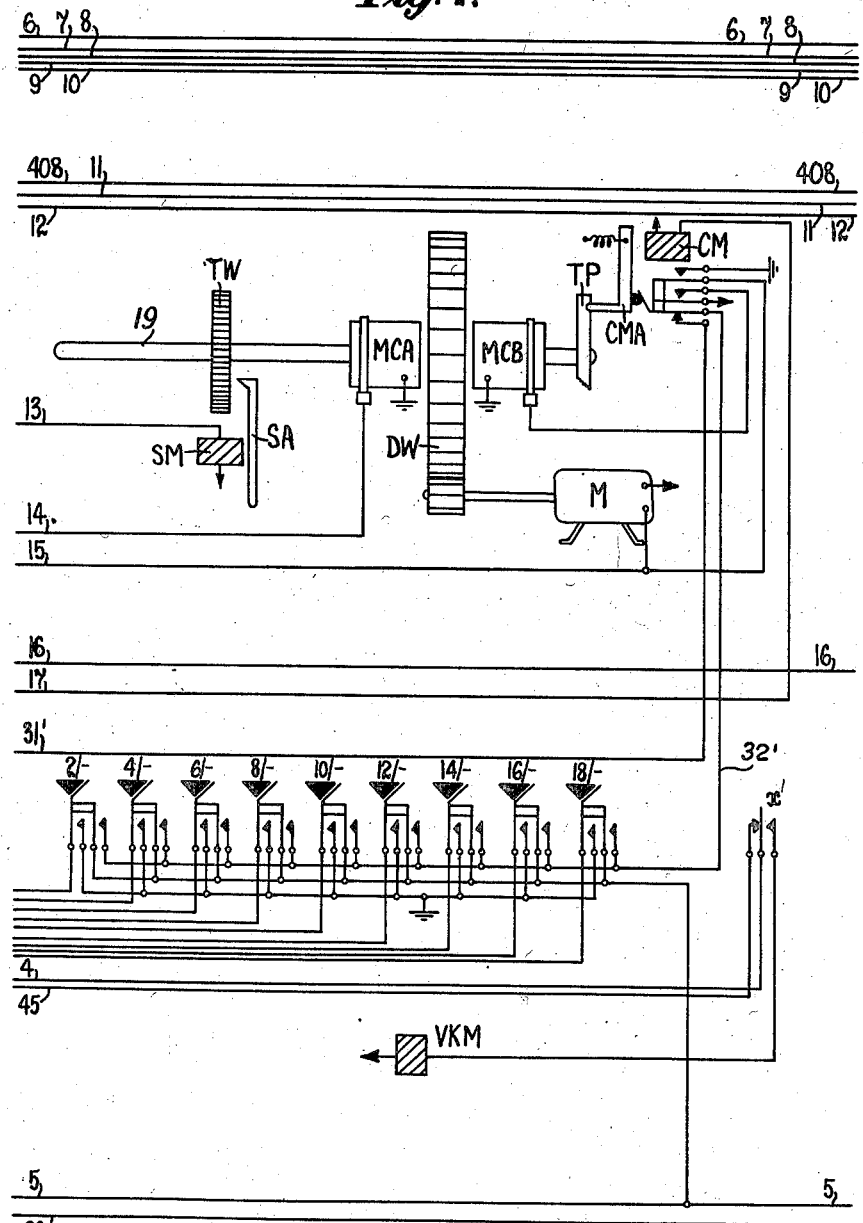
Figure 5:
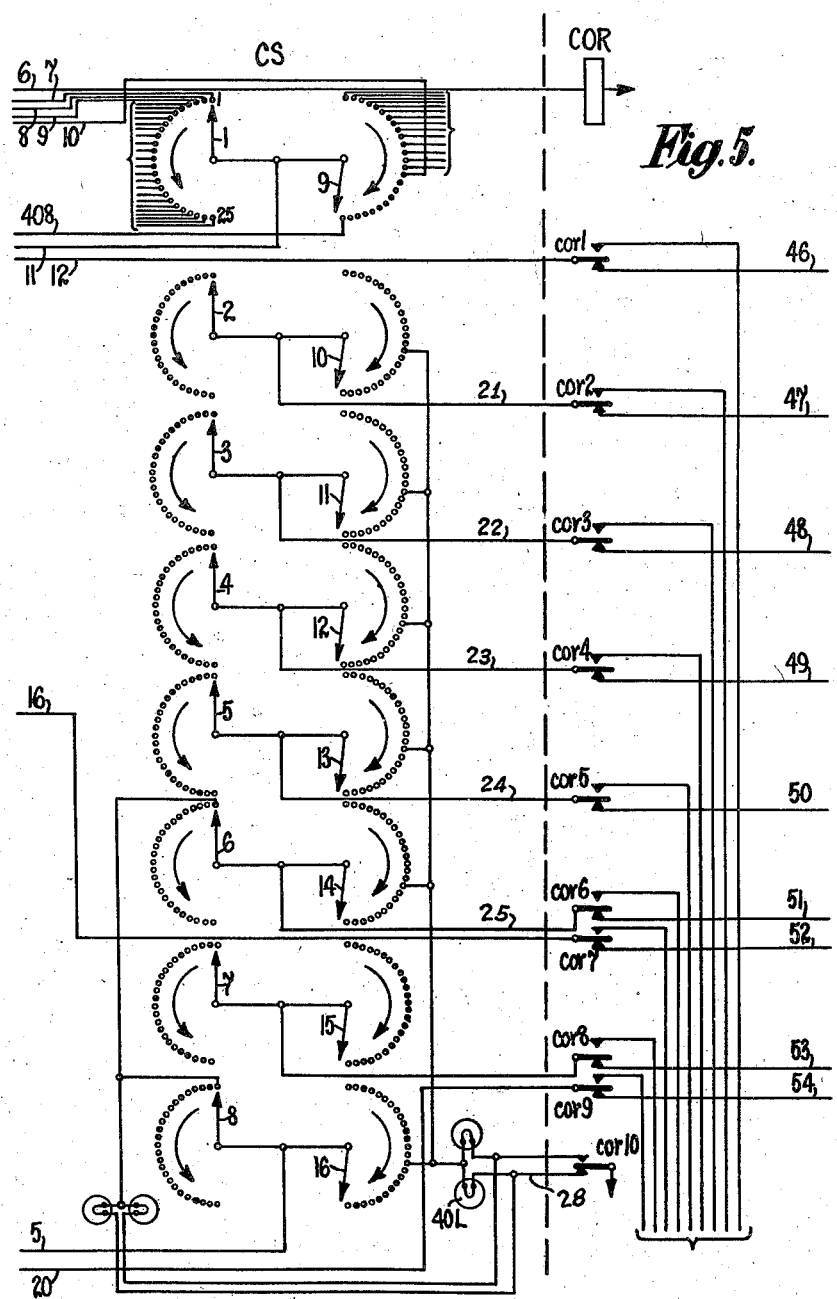
Figure 6:
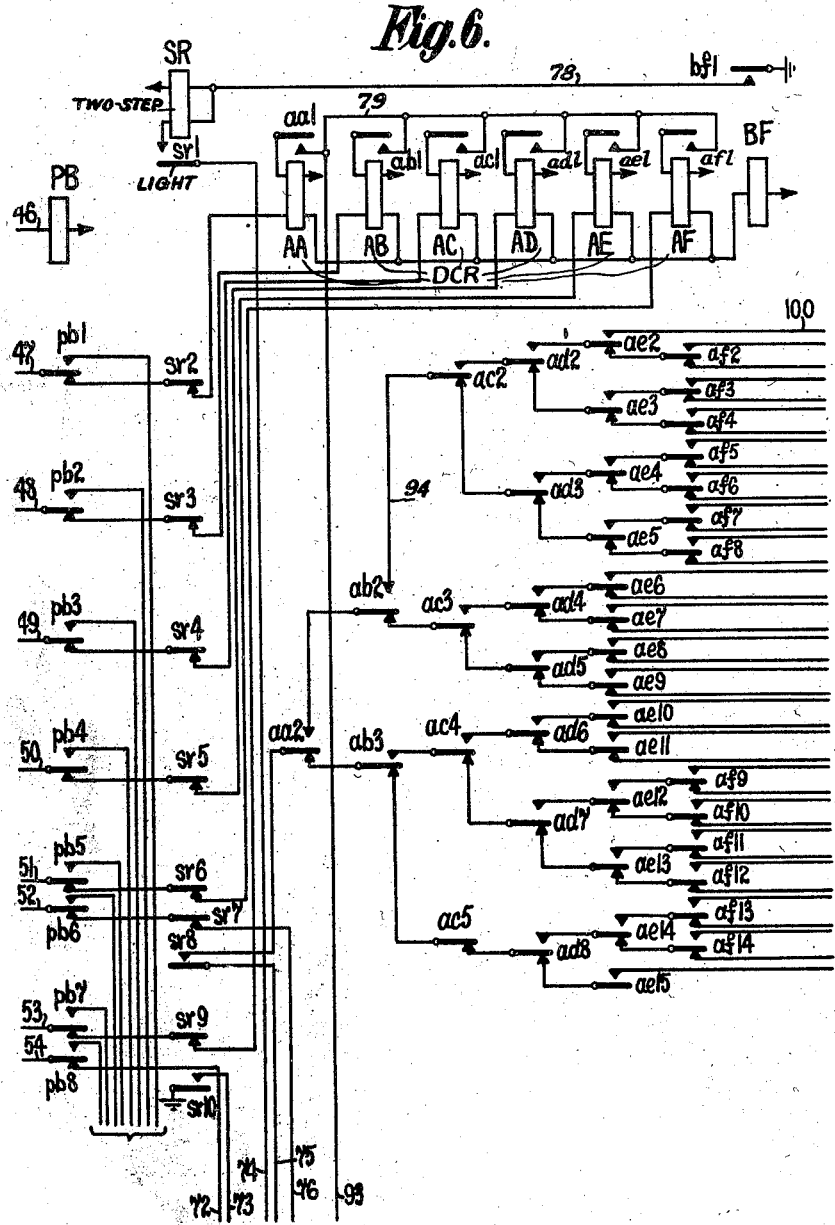
Figure 8:
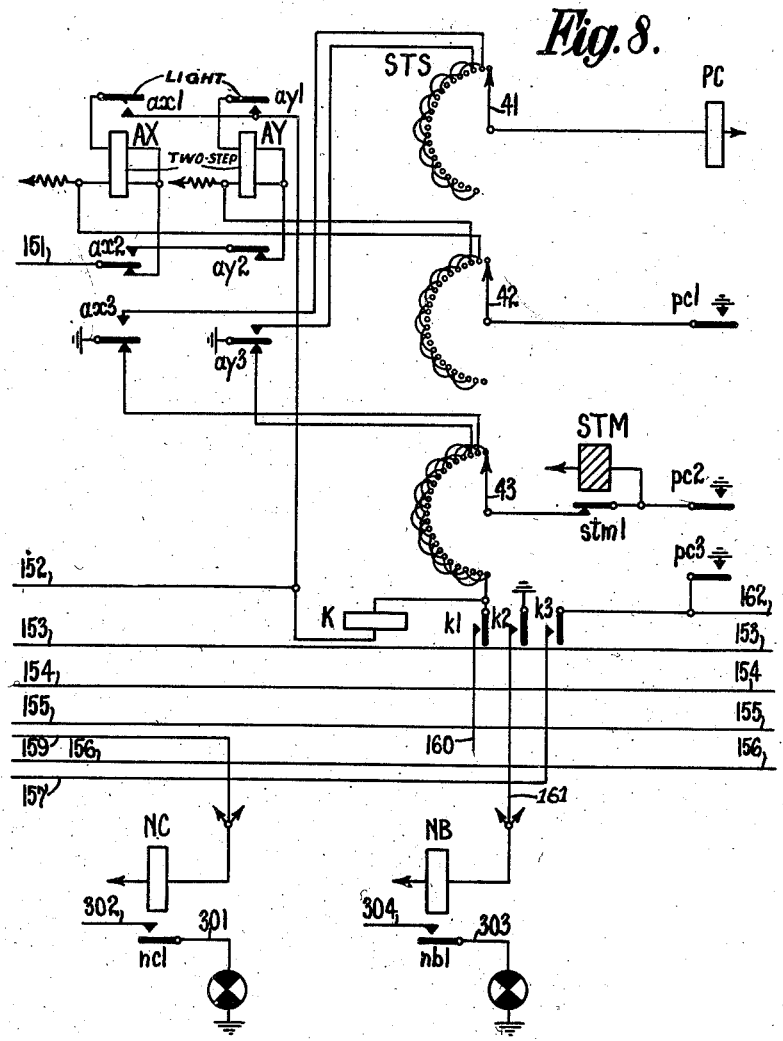

The general layout of the system according to the invention having been described, a detailed description of its operation will now be given, reference being had to Figs. 3–13, which as previously mentioned, should be arranged in the order shown in Fig. 1. Figs. 3, 4 and 5 show the circuit arrangements of a 2/- ticket-issuing machine and also the change-over relay COR which is operated when a horse key of the 41–80 group is depressed; Fig. 6 shows the relay PB which is energized due to the operation of the place key PK in order to transfer the control leads to the place totalizer and also the win decoding relay group DCR associated with the machine shown; Fig. 7 shows the associated collecting switch SS and the 2/- counting switch SCS associated with the registering equipment for horse 40; Fig. 11 shows the shillings display indicator for horse 40; Fig. 8 shows the translating switch STS which transfers every ten 2/- registrations to the £1 counting switch PCS shown in Fig. 9. Similarly every ten £1 registrations are transferred to the £10 counting switch TPC also shown in Fig. 9, and this procedure is repeated through the £100 counting switch HPC and the £1,000 counting switch shown in Fig. 10. Fig. 12 shows the 2/- collecting switch TS of the total register equipment and Fig. 13 shows the associated shillings counting switch TSC and the 2/- to £1 translating switch TST.

The collecting switches and also the counting switches are rotary step-by-step switches of the type well known in automatic telephone systems and are electro-magnetically driven by pawl and ratchet mechanism preferably advancing their wipers on the de-energization of the driving magnet. These switches shown and described on pages 38–40 of the publication entitled "Principles of Automatic Telephony, Circuits and Trunking" by Harry P. Mahoney are provided with one or more sets of contacts over which a corresponding number of brushes or wipers are driven at a speed which may be as high as 60 or 70 steps per second. Such switches are made with double-ended wipers and a semi-circular contact bank containing 25 contacts but the capacity of the switch is readily increased to 50 contacts for use in the present system by replacing the double-ended wipers with single ended ones and connecting them together in pairs and arranging them so that when one wiper of each pair is engaging with contacts, the other wiper is clear.

The collecting switches serving a group of ticket-issuing machines of one denomination are diagrammatically illustrated in Fig. 2a and are arranged so that the wipers of one switch never engage the same bank contacts as the wipers of any other switch in the group at the same instant. This is arranged by "slip-wiring" their operating circuits in the banks of wipers 25' and 26', that is to say, the first switch in the group which controls all the others is driven by impulses connected direct to the magnet from an external source while all other switches are driven in a local circuit controlled through their bank contacts and wipers. Thus bank contact 1 of the first switch is connected to bank contact 2 of the second switch, to bank contact 3 of the third switch, and to bank contact 4 of the fourth switch, and so on progressively throughout the whole group of switches, the remaining contacts being connected similarly. Moreover the circuits are arranged so that the various switches will all be standing on contacts which are directly multipled in the banks of the control wipers. Hence since a direct multiple is used for the banks over which indications are collected as regards these banks the switches are always at least one step out of phase. The controlling switch is not shown but a typical dependent switch is illustrated in Fig. 7 and its operation will be fully explained in the following description.

Considering now the circuit operation, when it is desired to start the betting, the operator at the control position operates the total win key TWK, Fig. 7, and the total place key (not shown) if place betting is to be permitted and also the start keys such as SK, Fig. 7 associated with the various horse register equipment corresponding to the number of horses in the race. The operation of the total win key TWK at one set of springs connects earth to the associated supervisory lamp TW and also to the common lead extending to all the start keys SK, and at the other set of springs extends earth over conductor 99 to operate relay TB, Fig. 12 in order to set in operation the collecting switch TS of the total register equipment. The operation of the start key SK at one set of springs lights the associated supervisory lamp SL and at the other set of springs connects earth over the obvious circuit to relay MB, Fig. 7. The operation of relay MB at armatures $mb3$—$mb1$ and their resting contacts opens the homing circuit of the 2/-, £1, £10, £100 and £1,000 counting switches shown in Figs. 7, 9 and 10. At armature $mb1$ relay MB also completes a circuit for relay NC, Fig. 8 which thereupon connects up the interrupter 301 to the first collecting switch of the 2/- group so that all the switches of the group start rotating. Moreover at armature $mb3$ a circuit is completed for relay K in series with magnet STM which is not operated at this time. Relay K however at armature $k2$ energizes relay NB, Fig. 8, over lead 161 whereupon interrupter 303 is connected to the first switch of the £1 group so that all the switches of this group also are set in operation. Consequently upon the operation of the total win key and all the start keys associated with the various horse register equipment the totalizing equipment is started up to register bets.

For the purpose of illustration it will be assumed that the operator at the 2/-ticket-issuing machine shown receives a request for a bet of 8- on horse No. 40 for a win. The operator then depresses horse key 40 and the win key WK shown in Fig. 3, whereupon a circuit may be traced from earth, armatures $sc2$ and $tc3$, conductor 3, right-hand springs of win key WK, left-hand springs of horse key 40, winding of relay S to battery and in parallel thereto by way of the right-hand springs of key 40 and conductor 10 to bank contact 40 of the code switch CS incorporated in the ticket machine. A further circuit may also be traced from earth over the left-hand springs of the win key WK, winding of magnet TCM to battery in parallel with the win lamp WL. The win lamp accordingly lights in view of the operator and the purchaser, and upon the operation of the magnet TCM and oscillating pallet in the ticket machine mechanism changes the type therein from place to win. Relay S, on operating over the circuit previously traced, at armature $s3$ extends earth over conductor 15 to start the motor M of the ticket machine, the mechanism of which is assumed to be similar to that described in the patent of Robert N. Saxby, No. 1,983,247, granted December 4, 1934. Furthermore at armature $s1$ earth from the resting contacts of the cancel key CK, armatures $tr1$ and $sc1$ and conductor 2 is extended by way of armature $z1$ to relay TS and at armature $s2$ the same earth is connected to the key locking magnet KLM which thereupon operates and locks itself by way of its armature $klm1$, conductor 4, armature $tc2$, resting contacts of key CK to earth. The operation of the magnet KLM locks all the keys, in any well-known manner such, for instance, as shown in British Patent No. 331,619, granted October 9, 1930, so as to prevent the release of the operated key and the operation of any other keys. Relay TS on operating connects battery at its armature $ts1$ over conductor 14 to energize the magnetic clutch MCA, which attracts the driving wheel DW and causes the rotation of the shaft 19 carrying the type wheel TW and the wipers 1—16 of the code switch CS, Fig. 5, the wheel and wipers being rigidly mounted on shaft 19. Therefore, these wipers are moved over their associated bank contacts, conveniently at the rate of 60 contacts per second. When wiper 9 encounters the bank contact 40 which was earthed by the operation of key 40, a circuit is completed from wiper 9 over conductor 11, resistance $x$, which is shunted by the condenser CC, to the winding of relay Z, Fig. 3. Relay Z thereupon operates very quickly owing to the effect of the condenser and at armature $z1$ opens the circuit of relay TS in order to effect the opening of the clutch circuit and completes a circuit over conductor 13 to energize the type wheel stop magnet SM, which thereupon attracts the stop arm SA, thus driving it into engagement with the type wheel in order to lock the latter in this position. Relay Z moreover at armature $z2$ extends earth from conductor 2 over conductor 5, wiper 16 of the code switch CS, lamp 40L, conductor 28, armature $cor10$ to battery whereupon the lamp glows to light up the number 40 which is visible to both the operator and the purchaser of the ticket. Hence upon the operation of the horse key and the win key a visual indication is provided at the ticket machine to the effect that horse 40 has been backed for a win. Moreover the earth off contact 40 associated with wiper 16 is connected by way of a bank commoning lead to contacts 40 associated with the wipers 14, 13, 12, 11 and 10 respectively and thence is extended by the wipers over conductors 21, 22, 23, 24 and 25 and the resting contacts of armatures $cor2$–$6$ conductors 47, 48, 49, 50 and 51, resting contacts of armatures $pb1$–$5$ and $sr2$–$6$ to the windings of the storing relays AA, AB, AC, AD and AE in the decoding group shown in Fig. 6. These relays thereupon operate over their lower windings in series with relay BF and at armatures $aa1$, $ab1$, $ac1$, $ad1$ and $ae1$ complete circuits for their upper locking windings by way of conductor 93 to earth at armature $a2$, Fig. 12. Relay BF upon operating extends earth at its armature $bf1$ over conductor 78 to the upper winding of relay SR, whereupon relay SR which is of the two-step type operates its light armature $sr1$ and prepares a circuit for its full operation at a later period.

Returning now to the ticket machine, the lighting of the win lamp and horse number 40 lamp indicates to the ticket-issuing operator and the purchaser that the bet has been correctly set-up and that the value key may now be depressed. In the example in question the 8/- value key shown in Fig. 4 will be depressed and consequent upon the mechanical action of the key, the springs $x'$ located at the end of the strip are operated, thereby extending earth from conductor 4, Fig. 3 over operated contacts of springs $x'$, winding of the key locking magnet VKM to battery. The operation of this magnet locks all the value keys as shown in the cited British patent in a circuit which is controlled by armature $tc2$ or the cancel key CK. At the left-hand springs of the 8/- value key earth is connected to bank contact 18 of the value switch VSW and at the right-hand springs of the key earth from conductor 5 is extended over conductor 32', resting springs controlled by the cam magnet arm CMA, conductor 31', armature $tc1$, winding of relay SC to battery. Relay SC thereupon operates and completes a locking circuit for itself at armature $sc5$. Furthermore at armature $sc1$ earth is disconnected from leads 2 and 5, at armature $sc2$ earth is disconnected from the win key and hence from horse key 40, at armature $sc3$ a circuit is prepared for relay TR and at armature $sc4$ a circuit is completed to the driving magnet VDM of the value switch VSW, whereupon the magnet energizes but does not yet advance the associated wipers. Relays S and Z are now de-energized but relay SC and the key locking magnets KLM and VKM remain locked up to the cancel key.

For the sake of convenience of description, the further operation of the ticket-issuing machine will not be dealt with at this point but consideration will be given to the circuit changes in the totalizing equipment. It will be appreciated that the equipment shown in Figs. 7–11 comprises merely the win register equipment for horse No. 40 and that there will be similar register equipments for the other horses to which connection is extended over wipers 21' and 22' of the collecting switch SS, Fig. 7. It will be understood also that whereas the banks of wipers 21' and 22' are connected in a straight multiple to all the collecting switches of the group, the banks of wipers 23' and 24' extend only to the decoding relay group associated with the particular ticket-issuing machine shown to which SS is individual.

Continuing now with the description of the registering of a 2/- bet on horse No. 40 for a win, since earth is now disconnected from the wiper 16 of the code switch CS, Fig. 5, and consequently also from the other wipers 10, 11, 12, 13 and 14, the circuits for the lower windings of the decoding relays shown in Fig. 6 are disconnected, whereupon the relay BF releases and at its armature $bf1$ disconnects earth from the conductor 78 extending to the junction of the windings of relay SR, thereby permitting relay SR to operate fully over both windings in series. Upon the full operation of relay SR the leads extending from the ticket machine to the decoding relay group are disconnected at armatures $sr2$–$sr7$ and $sr9$ and a circuit is completed from earth by way of the upper winding of relay C, Fig. 12, armature $a4$, conductor 75, armature $sr8$, Fig. 6, armature $aa2$, $ab2$, conductor 94, armatures $ac2$, $ad2$ and $ae2$, conductor 100 to bank contact 40 of wiper 23' of the collecting switch SS associated with this particular decoding relay group. The switch SS shown in Fig. 7 is one of the dependent switches and is arranged so that interaction between relay G and the magnet SDM causes the switch to rotate its wipers automatically until either wiper 25' or 26' encounters the bank contact which is earthed by the controlling switch of the group, whereupon relay G is short-circuited and the wipers come to rest. Consequently when the controlling switch advances one step, all the dependent switches will advance also because the respective G relays are no longer short-circuited. Since the banks corresponding to those engaged by wipers 25' and 26' are wired as explained above, it will happen that although the switches will operate in synchronism, the wipers corresponding to 21' and 22' of any two switches will not encounter multipled sets of bank contacts at the same instant. This feature permits the arrangement about to be described whereby the 2/- markings from all collecting switches of the group serve to operate a single stepping relay associated with the particular horse register equipment.

Returning now to the operation of the collecting switch SS, when earth is removed off bank contact 1 of wiper 26' upon the operation of the controlling switch, relay G will no longer be short-circuited and will therefore operate and at its armature $g2$ complete the circuit for the driving magnet SDM. The magnet at springs $sdm1$ opens the circuit of relay G which therefore de-energizes and opens the circuit of the magnet. The wipers are therefore advanced one step and relay G is then again short-circuited until the controlling switch again advances. In this manner the switch wipers are rotated over the bank contacts and when wiper 23' encounters bank contact 40 the circuit previously traced from earth through the winding of relay C, Fig. 12 is extended over wiper 23', Fig. 7, conductor 305, armature $g1$, conductor 306, wiper 21' and bank contact 40, conductor 98, armature $mb2$, winding of impulsing relay MA to battery. Relay MA thereupon operates and at armature $ma1$ energizes the driving magnet SCM of the 2/- counting switch SCS. Relay C, Fig. 12, operates in series with relay MA, Fig. 7, and at armature $c2$ completes the circuit of slow-to-operate relay B and also locks up by way of armature $b2$ and its lower winding. During the operating period of relay B, earth is extended over armature $b3$, conductor 198, armature $ta2$ and the lower winding of relay TA to battery, whereupon relay TA which is of the two-step type operates its light armature $ta1$ in order to prepare the circuit for the full operation of the relay at a later period. Moreover at armature $b1$ a circuit is completed to the lower winding of a further slow-to-operate relay A, which on operating locks up over its upper winding and armature $a3$ and conductor 73 to earth at armature $sr10$. Relay B on operating its armature $b3$ permits relay TA, Fig. 12, to operate fully over both windings in series to earth at armature $tb1$ over conductor 200, relay TB having been operated at the start of the betting by the total win key TWK. Relay TA on operating prepares a marking on the bank of the 2/- total collecting switch TS, the operation of which will be fully described later.

Returning now to the operation of the collecting switch SS, when the driving magnet SDM operates its armature $sdm1$, the circuit of relay G is opened whereupon it releases and at armature $g1$ opens the circuit for relay MA, Fig. 7, which it will be remembered was operated in series with relay C, Fig. 12. Relay MA accordingly releases and opens the circuit of the driving magnet SCM of the 2/- counting switch SCS of the horse register equipment, whereupon the wipers are advanced into engagement with the second set of bank contacts. In this position earth is no longer extended over conductor 141 from bank contact 1 of wiper 31 and as a result relay LA, Fig. 11, associated with the 2/- display switch SDS is released, and at armature la2 earth extended over conductor 140 from armature mb1 is connected by way of the interrupter springs sdsm1 to the winding of the driving magnet SDSM. Consequently the wipers of the switch SDS are advanced into engagement with bank contacts 2 whereat relay LA is again operated from earth over conductor 142, and the switch is thus stopped in this position until the reception of the next impulse by relay MA. Upon the re-operation of relay LA, earth is again connected to wipers 121—125 and wipers 127—131, whereupon circuits are completed by way of the second bank contacts of the respective banks in order to effect the lighting of the lamps 3, 7, 11, 15, 19 and 23 which form the numeral 1, thereby providing a visual indication to the public of the registration of one 2/- bet on this particular horse. Similarly as the betting proceeds, the wipers of the shilling display switch SDS will be advanced in correspondence with the wipers of the 2/- counting switch SCS, thereby lighting various other combinations of lamps in sequence in order to display digits corresponding to the number of 2/- bets on the horse. As the setting of the display switch SDS is controlled by the connection of earth to a particular bank contact and not by the transmission thereto of impulses, it will be appreciated that should the power supply fail for any reason the operation would continue satisfactorily as soon as it was restored without there being any possibility of a false indication due to the loss of one or more impulses. This feature also readily permits the indicator to be mounted as a self contained unit which may be withdrawn as a whole for adjustment purposes, the necessary electrical connections being made over suitable spring contacts. It would even be possible to remove the indicating unit temporarily while it was in operation and when it was replaced after the necessary adjustment had been made it would at once indicate correctly the figure it was desired to display.

Conveniently the ten leads extending from the various counting switches to the associated display units have directly connected to them pilot lamps preferably of the type employed in telephone switch-boards which may be located in the rear of the units themselves and indicate to an attendant the digit which the unit is displaying. Similar lamps may also be provided at the control position so as to indicate the state of the betting to the official in charge.

As a matter of convenience it has been assumed that the shillings indicator shows the number of 2/- bets rather than the actual number of shillings since then all the indicators may be wired identically. It will be understood however that there would be no difficulty in arranging for the shillings indicator to display shillings by the use of a display unit of the type illustrated and also a single row of lamps which were lighted to form the figure 1 when a tens digit was involved.

Fig. 14 indicates the lamps which are lighted to display the various digits, it being assumed that a bank of 24 lamps is employed comprising four vertical rows of six lamps each as shown in Fig. 11. The arrangement is, of course, quite arbitrary and could readily be modified if required by suitably altering the wiring of the banks of the switch SDS. The lamps used may be of the type commonly employed in electric signs and for better definition of the numeral each lamp is preferably enclosed in an individual cylindrical tube extending somewhat beyond the end of the lamp, the interior of the tube being dull black to prevent reflection of external light. It is moreover found convenient to cover the face of the indicator with a screen of fine mesh wire gauze which tends to give increased visibility in strong direct sunlight.

When the wipers of the switch SCS arrive at the 10th bank contact, earth connected to wiper 33 will be extended over conductor 151, armature ax2, lower winding of two-step relay AX to battery through a resistance, whereupon the relay operates its light armature ax1 to prepare the circuit for the full operation of the relay, and when the wipers are moved from the 10th position in response to the registration of a further 2/- bet, relay AX will operate fully over the circuit: earth, armature mb3, conductor 152, armature ax1, both windings of relay AX in series to battery. Relay AX thereupon at armature ax2 transfers the conductor 151 to a similar two-step relay AY in order to store the next £1 registration from the 2/- switch and furthermore at armature ax3 removes earth from the second bank contact of the lower bank of the shilling translating switch STS. Accordingly when both relays AX and AY have been operated, two separate £1 registrations are set up on the banks of the shilling translating switch STS. Since wiper 43 of the switch STS is resting on the first bank contact at this time, relay K is operated in series with the driving magnet STM as previously mentioned and at its armature k2 operates relay NB, which at its armature nb1 extends earth pulses at conveniently the rate of 40 per second to the magnet of the controlling collecting switch in the £1 group. The collecting switches in the £1 group are similar to the switch SS, and their banks are wired to the decoding relay groups associated with the £1 ticket-issuing machines. These switches are also controlled in a similar manner to that described for the 2/- collecting switches so that they will be rotated in synchronism, but no two switches will encounter the same set of bank contacts at the same instant. As the wipers of the £1 collecting switches are continuously rotating, £1 registrations will be picked up from the contacts extending from the decoding relay groups and in the example in question, these registrations will be extended over conductor 400, Fig. 7, which it will be understood is connected to bank contact 40 of all the £1 collecting switches, armature mb8, conductor 157, armature k3, Fig. 8 conductor 162, winding of relay OA, Fig. 9 to battery. Relay OA thereupon operates in series with a similar relay to relay C, Fig. 12 and at armature oa1 completes the circuit for the driving magnet PCM of the £1 counting switch PCS, Fig. 9. When the wipers of the relevant £1 collecting switch leave contact 40, relay OA will be released and accordingly the wipers of the £1 counting switch PCS will be advanced into engagement with the second set of bank contacts. In this position earth over wiper 51 will be extended over the conductor connected to the second bank contact to a similar display switch to that illustrated in Fig. 11 which thereupon operates to complete circuits for the appropriate lamps in the £1 display unit to provide a visual indication of the amount stored on the £1 counting switch.

As previously mentioned in order to prevent the £1 indications extending from the 2/- translating switch being superposed on those transmitted direct from the £1 collecting switches, means are provided for suspending the direct £1 registrations at predetermined intervals in order that the translated £1 registrations may be transferred to the £1 counting switch. When the wipers of the controlling collecting switch in the £1 group have completed one revolution, earth will be extended from the 50th bank contact of this switch over conductor 160 and armature k1, to one terminal of the winding of relay K and also by way of the bank commoning and first bank contact and wiper 43 of the shilling translating switch STS, interrupter springs stm1, winding of the driving magnet STM to battery, thereby short-circuiting relay K and energizing the magnet STM. Upon the release of the magnet due to the opening of its circuit the wipers 41, 42 and 43 of the switch STS will be advanced on to the second set of bank contacts. At armature k2 the circuit of relay NB, Fig. 8, is opened so that it releases and opens the impulsing circuit of the controlling collecting switch in the £1 group thus bringing all the switches to rest. At armature k3 a point is opened in the circuit over which the direct £1 registrations are transmitted to the £1 counting switch. Assuming that only one of the translating relays AX is operated at this time then when wiper 41 encounters the second bank contact, earth will be extended from the operated armature ax3 to the second bank contact and wiper 41, winding of relay PC to battery. Relay PC operates and at its armature pc2 completes a circuit for the driving magnet STM, at armature pc3 extends earth over conductor 162 to energize relay OA associated with the £1 counting switch PCS, and at armature pc1 connects earth by way of wiper 42 and the second bank contact to the lefthand terminal of the lower winding of relay AX. Relay AX is now short-circuited and therefore releases, thereby at armature ax3 opening the circuit of relay PC which also releases and in turn opens the circuit of the magnet STM, and that of relay OA of the £1 counting switch. Consequently the wipers of the switch STS are advanced on to the third set of contacts, while the wipers of the £1 counting switch are advanced an additional step to increase by one the number shown on the associated display unit which is controlled over wipers 51 and 52. Since it is assumed that the second translating relay AY is not operated at this time, relay PC will not again be operated when the wipers arrive on the third set of bank contacts, and at armature ay3, earth will be extended over bank contact and wiper 43, interrupter springs stm1 to the winding of the magnet STM, thus causing the magnet to again energize in order to advance the wipers a further step. When wiper 43 reaches its fourth position battery through magnet STM is extended to the winding of relay K to earth on conductor 152 and upon the reoperation of this latter relay, relay NB, Fig. 8, will again operate to complete the stepping circuit of the £1 collecting switches, and at armature k3 the impulsing relay OA of the £1 counting switch will again be connected direct to the 40th bank contact of the £1 collecting switches. These switches will now rotate in order to collect further markings from the £1 decoding relay groups and when the wipers of the controlling collecting switch again encounter bank contact 50, earth will again be extended over conductor 160 to release relay K so that the shilling translating switch STS may transfer further markings which have been stored meanwhile to the £1 counting switch.

It may be pointed out that, as shown, circuits are completed in parallel for relay NB by all the registers in operation. Hence it is conceivable that a transfer switch such as STS, Fig. 8, which had no stored registrations to transfer would complete its operation and restart the collecting switches before another transfer switch, moving somewhat more slowly because of digits to transfer had reached its home position. This would not produce any objectionable effect, however, since as the completion of the direct impulsing circuit is dependent on the operation of the associated relay K, no impulse could be transmitted to the register even though the collecting switches were rotating and the issue of a ticket would be held up until the next revolution. It could be arranged if desired that control of the collecting switches was effected by the K relays in series rather than in parallel as shown but it is not strictly necessary that the rotation of the collecting switches should be interrupted at all.

When the wiper 53 of the £1 counting switch PCS has made 10 steps, earth will be extended by way of the relevant bank contact to operate relay P which in turn completes a circuit for the slow relay Q so that when wiper 53 has advanced a further step relay P will release, and during the slow releasing period of relay Q earth will be extended over armatures p1 and q1, conductor 404, winding of the £10 counting switch impulsing relay NA to battery. By this means it will be seen that relay NA receives one impulse for every 10 steps of the £1 counting switch and at armature na1 repeats these impulses to the driving magnet TPM to effect the stepping of the wipers 61—66. It will be understood that wipers 61 and 62 control a display unit similar to that shown in Fig. 11, while wipers 63 and 64 effect the operation of relay PX every 10 steps in order to transfer a £100 registration to the magnet HPM of the £100 counting switch. Similarly the £100 counting switch is arranged to control an indicator from its wipers 71 and 72 and when wipers 73 and 74 encounter the 10th bank contact, relay PY is operated in order to effect the transmission of an impulse to the magnet ThPM of the £1,000 counting switch ThPC. It will be appreciated that further switches similarly controlled may be added if the installation is sufficiently large to justify such provision.

It should also be mentioned that in case it is considered desirable to provide machines which issue £10 tickets, a translating switch similar to STS will be needed between the £1 counting switch PCS and the £10 counting switch TPC, the circuit arrangements of this switch being such that the collecting switches serving the £10 machines are brought to rest periodically to permit transfer of translated registrations from the £1 counting switch. Similar considerations will apply to the provision of £100 ticket-issuing machines.

A description will now be given of the arrangements provided in order to effect the operation of the total register equipment. For this purpose, it will be appreciated, it is unnecessary to discriminate between the various horses and only the number of tickets issued need be totalled. Considering therefore the 2/- collecting switch TS of the total register shown in Fig. 12, it will be remembered that relay TA is operated from earth extended over conductor 198 from relay C, and that it then locks over armature ta1 to earth on conductor 200 from armature tb1, and at armature ta3 transfers earth over conductor 199 from the appropriate contact in the bank of wiper 92 to the corresponding contact in the bank of wiper 91. The collecting switch TS is continuously rotating over a circuit which may be traced from earth at armature tc1, armature tb2, conductor 199, by way of the resting contacts of 25 relays similar to TA to the bank contacts associated with wiper 92 and by way of resting contacts of 25 relays similar to TG to the bank of wiper 96 so that when no tickets are being issued the whole 50 contacts of the bank are earthed. This earth is extended over wiper 92, conductor 204, interrupter springs tsm1, winding of driving magnet TSM to battery. Consequently so long as either wiper 92 or wiper 96 encounters earthed bank contacts, the driving magnet TSM will be energized in a self-interrupted circuit in order to rotate the wipers. In the present case since relay TA is operated, when wiper 92 encounters the first bank contact, it will not find earth, but earth over conductor 199 will be extended by way of the operated armature ta3, first bank contact and wiper 91, conductor 205, winding of relay TD to battery. Relay TD operates and at armature td1 extends earth over conductor 207 and armature tf1 to the winding of relay TE of the 2/- total counting switch TSC to battery, at armature td2 completes a locking circuit for itself dependent on relay TA over wiper 93, and at armature td3 extends earth over conductor 203, wiper 94 and first bank contact to the left-hand terminal of the lower winding of relay TA. Relay TA is thus short-circuited and upon its release allows relay TD to release whereupon the switch TS resumes its rotation due to self-interruption until it finds a further marking to collect. Relay TD on releasing opens the circuit of relay TE, Fig. 13 which in turn opens the circuit of the driving magnet TSCM thus causing the wipers 101—106 to be advanced to the next set of bank contacts. From previous description it will be understood that wipers 105 and 106 effect the control of the shillings display unit of the total indicator, in a manner which is substantially identical with that described in connection with Figs. 7 and 11. Relay TA on releasing, also removes earth from conductor 74, which extends to the locking circuit of the cutoff relay SR associated with the particular 2/- decoding relay group and accordingly until the bet has been duly registered on the total registering switches, relay SR remains operated and it is impossible to issue a further ticket. When ten 2/- bets have been duly registered on the total shillings counting switch TSC, earth from wiper 101 is extended over conductor 405, armature bw2, lower winding of two-step relay BW to battery through a resistance. Relay BW operates its light armature bw1 in this circuit and when the wiper 101 advances a further step, relay BW operates fully over the circuit: earth, armature tf2, conductor 117, armature bw1, both windings of relay BW in series to battery. Similarly when wiper 101 of the switch TSC has made a further ten steps earth will again be connected to the lead 405 in order to effect the operation of the second storing relay BX, while the third and fourth storing relays BY and BZ are operated in turn after a further 10 steps of the switch TSC. When four £1 translations have thus been set up and relay BZ becomes operated, earth at armature bz4 is extended over conductor 406 to operate the relay TC which thereupon at armature tc1 disconnects earth from the common conductor 199, thereby suspending the collecting operation of the switch TS and at armature tc2 extends earth over conductor 407 and armature th1 to the right-hand terminal of relay TH which was energized on the operation of the start key TWK from earth, armature tf2, conductor 117, winding of relay TH, first bank contact and wiper 114 of the total shillings translating switch TST, interrupter springs tstm1 and winding of magnet TSTM to battery. Since direct earth is now connected to the battery side of the winding of relay TH it is short-circuited and releases while magnet TSTM is now able to operate and advances the wipers 111—114 on to the second set of bank contacts. Upon the release of relay TH, at armature th2 the impulsing circuit to the £1 collecting switch (not shown) associated with the total register equipment is opened, and at armature th3 the lead over which impulses are sent direct to the impulsing relay of the £1 counting switch of the total register equipment is also opened. A circuit may now be traced from earth at armature bw3, second bank contact and wiper 113, winding of relay TG to battery, whereupon relay TG operates and at armature tg1 extends earth over conductor 208 to the impulsing relay of the £1 counting switch which is assumed to be identical with the switch PCS shown for the horse register equipment. Moreover at armature tg2 earth is connected by way of wiper 111 to shunt down relay BW, and at armature tg3 a circuit is completed to the driving magnet TSTM. When relay BW releases, it opens the circuit of relay TG which also releases, thereby at armature tg1 opening the circuit of the impulsing relay of the £1 counting switch, and at armature tg3 opening the energizing circuit of the driving magnet TSTM. Accordingly the £1 counting switch of the total register equipment is advanced one step to light up the appropriate number on the £1 display unit, and upon the de-energization of the magnet TSTM the wipers of the switch TST are advanced into engagement with the third set of bank contacts. In this position relay TG will again be operated from earth at the armature bx3 and a further impulse is thereby transmitted to the £1 counting switch of the total register. In a similar manner the marking of relays BY and BZ will also be collected and in turn transferred to the £1 counting switch and when this has been done the wiper 114 will then be resting on the sixth bank contact, in which position battery through the magnet TSTM will again be extended to the winding of relay TH which will thereupon reoperate in order to start the rotation of the £1 collecting switch and complete the impulsing circuit to the £1 counting switch. Moreover the release of relay BZ will bring down relay TC and permit the switch TS to continue its motion.

Since there is a possibility that when the betting period came to an end, as many as three of the storage relays might be operated, it is preferably arranged that the transfer switch TST makes a special movement to collect up these registrations and avoid an incorrect total. The necessary circuits for effecting this operation have not been shown but it will be apparent to those skilled in the art that there is no difficulty in arranging for the switch TST to be moved off normal on the restoration of the key TWK.

A description will now be given of the further operations at the ticket-issuing machine which result in the delivery of a 2/- ticket in response to the operations previously described. It will be recalled that when the marking was located by the collecting switch SS relay C of the win total registering equipment operated in series with the impulsing relay MA associated with the 2/- register of the horse register equipment. Thereupon a circuit is completed from earth, armature c1, Fig. 12, conductor 72, armature pb8, conductor 54, armature cor9, conductor 20, armature sc3, winding of relay TR to battery. Relay TR thereupon energizes and at armature tr1 opens the circuit of relay SC and extends earth from the resting springs of the cancel key CK over conductor 17 to the cam magnet CM, Fig. 4 which thereupon attracts its armature CMA to operate the associated spring combination. At one set of springs the motor M is again started up and at another set of springs battery is connected to the magnetic clutch MCB which attracts the driving wheel DW, which effects the rotation of the cam assembly in order to effect the printing and the issuing of a ticket. The cam magnet CM lifts the armature CMA clear of a notch in the printing cam plate TP and during the subsequent rotation of the cam plate the armature is arranged to ride on the surface thereby holding the associated spring assembly in an operated condition independent of the energization of the cam magnet, which is de-energized when relay TR falls back owing to its circuit being opened upon the de-energization of relay SC. The printed ticket is thereupon issued to the purchaser, although it could readily be arranged if required by suspending the operation of the cutting off mechanism that the four tickets requested by the purchaser were delivered in one strip. Thus one bet must be registered in both the 2/ register of the competitor registering equipment and in the 2/ register of the win total registering equipment by the completion of the circuit of relays MA and C before the ticket issuing machine can be released to issue the ticket.

The sequence of operations described above has resulted in the issue of one printed ticket to the purchaser and the registration of the bet on the appropriate horse register equipment and on the total register equipment. Since the driving magnet of the value switch VSW is also de-energized upon the release of relay SC, the associated wipers 901 and 902 are moved on to the second set of bank contacts. Moreover, upon the release of relay SC, earth from the resting contact and armature SC2 will again be extended over armature tc3, conductor 3, operated springs of win key to the horse key 40 and thence to the 40th bank contact of the code switch CS, wiper 9, winding of relay Z to battery. Relay Z therefore re-operates and in conjunction with relay S which is also again operated, completes the circuit of the type wheel stopping magnet SM, and also extends earth from conductor 2 by way of armature z2, conductor 5, wiper 16, bank contact 40, to light the relevant horse lamp, and furthermore extends earth by way of the bank contacts and wipers 14, 13, 12, 11 and 10 to effect the operation of the relays AA, AB, AC, and AE of the associated decoding relay group, thereby again preparing for making the appropriate contact in the collecting switch bank.

When the issue of the previous ticket is completed, the printing cam plate TP returns to its normal position and permits the cam magnet armature CMA to restore the associated contact springs. Thereupon the circuits of the clutch magnet MCB and of the motor M are opened and the printing and issuing mechanism comes to rest. Relay SC is then again energized over the lowermost pair of springs and prepares a circuit for relay TR which when operated by current flow from the totalizing equipment permits the issue of a further ticket. The operation of relay SC as before removes earth from the control leads extending to the decoding relay group so that relay BF de-energizes and relay SR energizes.

As a total of four tickets is required by the purchaser for his stake of 8/- it will be appreciated that the foregoing operations must be effected four times before the ticket machine is restored to service for the issuing of tickets of a different character. When the full complement of four tickets has been issued from the machine, wipers 901 and 902 of the value switch VSW will be stepped into engagement with the fifth set of bank contacts in which position earth over the operated springs of the 8/- value key will be extended to relay TC. Relay TC on operating at armature tc1 opens a point in the energizing circuit of relay SC, at armature tc2 opens the circuit of the key locking magnets KLM and VKM in order to release the horse key 40, the win key WK and the value key 8/-, and at armature tc3 a further point is opened in the earth circuit to the operated contacts of the win key WK.

Since the value key is now restored to normal, relay TC de-energizes and at armature tc2 completes a circuit from earth on the springs of the cancel key over conductor 4 and springs X in normal position for restoring the switch VSW to normal position by self interruption over the bank of wiper 902. Hence when the printing cam plate again reaches normal position after the issue of the last ticket of the set, the springs associated therewith will be released, but as the value key is no longer operated, relay SC cannot again be operated and the ticket machine is completely restored to normal.

A description will now be given of the issuing of a number of test tickets from the machine for the purpose of testing its operation without affecting the central equipment; this is effected by the operation of the win key WK or place key PK, the test key TK and one or other of the value keys. When the test key TK is operated, earth is extended over armatures sc2 and tc3, conductor 3, operated springs of the win or place keys, operated springs of the test key TK over conductor 408 to the 50th bank contact of the code switch CS, Fig. 5, and also over other operated springs of the test key TK to the winding of the start relay S. Relay S thereupon operates as previously described and at armature s2 completes a circuit for the locking magnet KLM, at armature s1 completes a circuit for relay TS which operates an denergizes the clutch MCA and at armature s3 completes the circuit for the motor M which thereupon drives the shaft carrying the type wheel and the wipers 1—16 until wiper 9 encounters bank contact 50. In this position earth is extended over wiper 9 and conductor 11 to relay Z, Fig. 3, which operates and at armature z1 opens the circuit of TS in order to de-energize the clutch MCA and completes the circuit of the type wheel stop magnet SM in order to lock the type wheel in the 50th position. Relay Z, moreover, at armature z3 prepares a circuit for relay TR and at armature z2 extends earth from conductor 2 by way of armature z2, conductor 5, contacts of the operated value key, conductor 32', resting springs associated with the printing cam plate, conductor 31', armature tc1 to the winding of relay SC. Relay SC thereupon operates and at armature sc5 locks up to the cancel key over armature tr1 and also completes a circuit from: earth, armature z3, operated springs of test key TK, conductor 409, armature sc3, winding of relay TR to battery. Relay TR thereupon operates to provide an energizing circuit for the cam magnet CM to set in operation the printing mechanism which then operates to deliver a ticket in the manner previously described. As the wipers and the type wheel have been advanced to the 50th position of the code switch which is unwired, no connections will be made to the decoding relay group shown in Fig. 6, and no effect is produced on the central equipment. The type wheel may conveniently be inscribed in the 50th position with the words "test ticket" in place of the usual horse number, so that the issue of tickets under the control of the test key will be clearly indicated and these tickets are not likely to be mistaken for tickets representing bets on particular horses. From the description already given it will be appreciated that the issue of test tickets will continue until the wipers of the value switch VSW encounter the contact marked by the operated value key whereupon a circuit will be completed for relay TC and the energizing circuit of relay SC will be opened at armature tc1 and the circuits of the key locking magnets KLM and VKM will also be opened.

A description will now be given of the cancel feature which is provided to enable the operator of the ticket machine to cancel a bet which has already been set up, provided the associated value key has not been operated at this time. When the cancel key CK shown in Fig. 3 is operated in these circumstances, earth at the left-hand set of springs is disconnected from the key locking magnet KLM while at its other set of springs earth is disconnected from the win or place keys and hence from the horse keys and the wipers of the code switch CS, so that the circuits of the lower windings of the appropriate relays in the decoding group, Fig. 6, are opened. Furthermore at the operated springs of the cancel key earth is extended over conductor 16, armature cor1, conductor 52, armatures pb6 and sr7, conductor 76, lower winding of relay A, Fig. 12 to battery. Relay A thereupon operates and at armature a2 opens the locking circuit of the storing relays in the decoding relay group and at armature a1 opens the circuit of the relay SR. By this means all the relays and the keys set up are restored to normal and a marking earth is not connected to the banks of the associated collecting switches owing to the disconnection of relay C at armature a4.

Considering now the registration of bets on horses 41 to 80, it will be noted that the keys associated with these horses are equipped with an additional set of make contacts by means of which earth is extended over conductor 6 to the change-over relay COR which therefore operates and transfers the code leads extending from the ticket machine on to a separate decoding relay group with an associated collecting switch which transfers the markings in its bank to horse register equipments 41 to 80. Thus, by the addition of one lead between the ticket machine and the central registering equipment, the necessary switching operations may be effected to enable double the number of horses to be catered for.

The operation of issuing a ticket for a place bet does not require any lengthy description. It will suffice to point out that owing to the operation of the place key PK instead of the win key WK the oscillating pallet remains in its normal position, the place lamp PL is lighted and earth is extended over lead 12, armature cor1, lead 46 to relay PB. This relay on operating, at its armatures pb1— pb8 transfers the operating leads to the place totalizer on which the bet is then registered in the manner above described for the win totalizer.

The various homing circuits which have been provided in order to restore the switches to a home position when they are no longer in use will now be described. When it is desired to restore the horse and total registers to normal, the operated start keys such as SK and the total win key TWK, Fig. 7, and also the total place key (not shown) are released, whereupon relay MB is deenergized. Thereupon at armatures mb3—mb7 the homing circuits to the various counting switches of the horse registering equipment No. 40 are completed, at armature mb1 earth is disconnected from the wipers which control the display indicator of the shillings counting switch SCS, at armature mb2 the drive to the 2/- collecting switches is opened. and at armature mb7 one of the parallel circuits of the common relay NC, Fig. 8, which controls the drive to the 2/- collecting switches is opened. It must be mentioned that a similar armature to mb1 may be arranged to connect earth to the wipers of the £1, £10, £100 and £1,000 counting switches in order to prevent any display during the homing operation and when the equipment is not in use. Moreover the release of key TWK opens the circuit to relay TB, Fig. 12, which in turn brings down relay TF, Fig. 13, thereby at armature tf1 opening the circuit to the impulsing relay TE, and at armature tf2 completing a homing circuit for the switch TSC. It will be understood that the other counting switches associated with the total register equipment will be restored to home position in a similar manner, the homing circuits being completed by further armatures on relay TF.

I claim:

1. In a totalizing system, a ticket issuing machine adapted to issue tickets of a certain unit value, said machine provided with a competitor key and a plurality of value keys, registering equipment, means responsive to the operation of said competitor key and one of said value keys for operating said equipment to register a number of unit values equivalent to the value key operated and means responsive to the registration of each unit value for operating said ticket issuing machine after each unit registration to issue a unit-value ticket.

2. In a totalizing system, a plurality of ticket issuing machines adapted to issue tickets of a certain unit value, each machine provided with a plurality of competitor keys and a plurality of value keys, registering equipment individual to each competitor, means for each machine responsive to the operation of one of said competitor keys and one of said value keys of the associated machine for sending an impulse to the register equipment of the competitor corresponding to the competitor key operated, said equipment operated by said impulse to register a number of unit values equivalent to the value key operated, means responsive to the receipt of said impulse by the register equipment for operating the proper machine to issue a unit-value ticket, and means for preventing the simultaneous operation of an individual register equipment by two or more of said said first mentioned means.

3. In a totalizing system, a ticket issuing machine adapted to issue tickets of a certain unit value, said machine having a plurality of competitor keys and a plurality of value keys, registering equipment individual to each competitor, an operating circuit for each registering equipment, means responsive to the operation of one of said competitor keys and one of said value keys for preparing the operating circuit of the registering equipment individual to the competitor corresponding to the operated competitor key, means for repeatedly and momentarily associating said registering equipments with their operating circuits one at a time, means whereby the registering equipment individual to the competitor corresponding to the operated competitor key is operated when associated with its prepared operating circuit to register a unit value, and means responsive to the association of the register equipment with a prepared operating circuit for operating said machine to issue a unit value ticket.

4. In a totalizing system, a ticket issuing machine adapted to issue tickets of a certain unit value, said machine having a plurality of competitor keys and a plurality of value keys, registering equipment individual to each competitor, an operating circuit for each registering equipment, means responsive to the operation of one of said competitor keys and one of said value keys for preparing the operating circuit of the registering equipment individual to the competitor corresponding to the operated competitor key, means for repeatedly and momentarily associating said registering equipments with their operating circuits one at a time, means whereby the registering equipment individual to the competitor corresponding to the operated competitor key is operated when associated with its prepared operating circuit to register a unit value by completing said circuit, means responsive to the completion of said circuit for operating said machine to issue a unit value ticket, and means whereby said operating circuit is prepared a number of times until the corresponding register equipment has been operated a corresponding number of times to register a number of unit values equivalent in total to the value key operated and the ticket machine operated a corresponding number of times to issue a corresponding number of unit-value tickets.

5. In a totalizing system, a ticket issuing machine adapted to issue tickets of a certain unit value, said machine having a plurality of competitor keys and a plurality of value keys, register equipment individual to each competitor, an operating circuit for each register equipment, a constantly rotating switch for repeatedly and momentarily connecting said register equipments to their operating circuits one at a time, means responsive to the operation of one of said competitor keys for selecting the operating circuit of the register equipment corresponding to the competitor key operated, means then responsive to an operation of one of said value keys for connecting an operating potential to the selected operating circuit whereby the corresponding register equipment is operated to register a unit value when next connected to said operating circuit by said switch, means responsive to the connection of the register equipment to the operating circuit having operating potential connected thereto for operating said machine to issue a unit value ticket, and means whereby said selecting of said operating circuit and the connecting of the operating potential thereto are repeated until said corresponding register equipment has been connected to said operating circuit and operated a number of times to register a number of unit values equivalent in total to the value key operated and said machine has been operated after each unit-value registration to issue a number of unit-value tickets equal to the number of unit-value registrations.

6. In a totalizing system, a ticket issuing machine adapted to issue tickets of a certain unit value, said machine having a plurality of competitor keys and a plurality of value keys, register equipment individual to each competitor, an operating circuit for each register equipment, a constantly rotating switch repeatedly and momentarily connecting said register equipments with their operating circuits one at a time, a combination relay group having pyramided contacts by means of which said operating circuits are selected when said relays are operated in various combinations, means responsive to the operation of one of said competitor keys for operating said relays in a certain combination to select the operating circuit of the register equipment corresponding to the competitor key operated, means then responsive to the operation of one of said value keys for connecting an operating potential to the selected operating circuit whereby said corresponding register equipment when thereafter connected to said operating circuit by said switch is operated to register a unit value, means responsive to the connection of said corresponding register equipment to its operating circuit while said potential is connected thereto for operating said machine to issue a unit value ticket, and means whereby said selection of the operating circuit and the connection of said potential thereto are repeated until said corresponding register equipment has been connected thereto and operated a number of times to register a number of unit values equivalent in total to the value represented by the value key operated and said machine has been operated to issue a corresponding number of unit-value tickets.

7. In a totalizing system, a ticket issuing machine adapted to issue tickets of a certain unit value, said machine having a plurality of competitor keys and a plurality of value keys, register equipment individual to each competitor, an operating circuit for each register equipment, a constantly rotating switch repeatedly and momentarily connecting said register equipments with their operating circuits one at a time, a combination relay group having pyramided contacts by means of which said operating circuits are selected when said relays are operated in various combinations, a finder switch associated with said machine and responsive to the operation of one of said competitor keys for finding the operated competitor key and operating said relays in a certain combination to select the operating circuit of the register equipment corresponding to the operated competitor key, means then responsive to the operation of one of said value keys for connecting an operating potential to the selected circuit whereby said corresponding register equipment when next connected to its operating circuit by said switch is operated to register a unit value, means responsive to the connection of said corresponding register equipment to its operating circuit while said potential is connected thereto for operating said machine to issue a unit-value ticket, and means whereby said circuit selection and the connection of said potential thereto are repeated until said corresponding register equipment has been connected thereto and operated a number of times to register a number of unit values equivalent in total to the value represented by the operated value key and said machine has been operated a corresponding number of times to issue a corresponding number of unit-value tickets.

8. In a totalizing system, a plurality of ticket issuing machines adapted to issue tickets of decimally related unit values, each machine having a plurality of competitor keys and a plurality of value keys and adapted to issue tickets of only one unit value, register equipment individual to each competitor adapted to register all of said unit values, means associated with each machine and responsive to the operation of one of the competitor keys and one of the value keys therein for operating the register equipment individual to the competitor corresponding to the operated competitor key a number of times to register a number of the unit values of that machine equivalent in total to the value represented by the operated value key, and means for operating the machine in which the keys were operated to issue a unit-value ticket for each registration, and means in the operated register equipment for controlling the operation of said last means.

9. In a registering system, a plurality of ticket issuing machines, a plurality of registering devices adapted to register unit value registrations common to said machines, a register key for each device in each machine, a plurality of number keys in each machine representing multiples of said unit value, means responsive to the operation of one of said register keys in a machine for selecting the corresponding registering device and closing an electrical circuit from it to said machine, and means then responsive to the operation of one of said number keys for electrically operating the selected device over said circuit to register a number of unit-value registrations according to the number key operated.

10. In a totalizing system, a first ticket issuing machine adapted to issue tickets of a certain unit value, a second such machine adapted to issue tickets of a unit value decimally related to the certain unit value, a first register for making certain-unit-value registrations, a second register for making registrations of the decimally related unit value, means associated with each machine and including a key in the associated machine for operating the corresponding register to make a unit-value registration therein and for operating the associated machine to issue a ticket of its particular unit value, means for transferring a plurality of said certain-unit-value registrations equivalent to one decimally-related unit value from the first register to the second register as a single registration therein, and means for preventing the operation of the second register by the means associated with said second machine while said transfer is taking place.

11. In a totalizing system, a plurality of first registers adapted to make registrations of a certain unit value, a plurality of second registers adapted to make registrations of a unit value decimally related to said certain unit value, one first register and one second register associated with each other, a plurality of first ticket issuing machines adapted to issue tickets of said certain unit value, a plurality of second ticket issuing machines adapted to issue tickets of said decimally-related unit value, each machine having a register key for each of the corresponding unit value registers, means for associating each first register with said first machines successively and all of said first registers with each first machine successively, similar means for similarly associating said second registers with said second machines, means individual to each machine and controlled by the register keys of the associated machine individually for operating the register corresponding to the controlling register key while said corresponding register is associated with the machine for making a unit-value registration, means responsive to the association of one of said registers with a machine having an operated key for operating the proper ticket machine to issue a ticket of its particular unit value, and means associated with each first register for transferring a plurality of said certain-unit-value registrations therefrom, equivalent to one decimally related unit value, to the associated second register as a single registration.

12. In a totalizing system, a plurality of first registers adapted to make registrations of a certain unit value, a plurality of second registers adapted to make registrations of a unit value decimally related to said certain unit value, one first register and one second register associated with each other, a plurality of first ticket issuing machines adapted to issue tickets of said certain unit value, a plurality of second ticket issuing machines adapted to issue tickets of said decimally-related unit value each machine having a register key for each of the corresponding unit value registers, means for associating each first register with said first machines successively and all of said first registers with each first machine successively, similar means for similarly associating said second registers with said second machines, means individual to each machine and controlled by the register keys of the associated machine individually for initiating the operation of the register corresponding to the controlling register key while said corresponding register is associated with the machine for making a unit-value registration, means responsive to the initiation of the operation of one of said registers for operating the proper ticket machine to issue a ticket of its particular unit value, means associated with each first register for transferring a plurality of said certain unit-value registrations therefrom, equivalent to one decimally related unit value, to the associated second register as a single registration, and means for preventing the operation of the associated second register by any of said register key controlled means associated with each of said second machines while said transfer is taking place.

13. In a totalizing system, a first register for making registrations of a certain unit value, a second register for making registrations of a unit value decimally related to said certain unit value, a plurality of first ticket issue machines adapted to issue tickets of said certain unit value, a plurality of second ticket issuing machines adapted to issue tickets of said decimally related unit value, means for associating said first register with said first machines successively and for associating said second register with said second machines successively, individual means for each ticket machine including a key in the machine for causing the operation of the corresponding register while it is associated with the machine to make a unit-value registration and to control the ticket machine to issue a ticket of its particular unit value, and means for transferring a plurality of said certain unit-value registrations equivalent to one of said decimally related unit values from said first register to said second register as a single registration.

14. In a totalizing system, a first register for making registrations of a certain unit value, a second register for making registrations of a unit value decimally related to said certain unit value, a plurality of first ticket issue machines adapted to issue tickets of said certain unit value, a plurality of second ticket issuing machines adapted to issue tickets of said decimally related unit value, means for associating said first register with said first machines successively and for associating said second register with said second machines successively, individual means for each ticket machine including a key in the machine for causing the operation of the corresponding register while it is associated with the machine to make a unit-value registration and to control the ticket machine to issue a ticket of its particular unit value, means for transferring a plurality of said certain unit value registrations equivalent to one of said decimally related unit values from said first register to said second register as a single registration, and means for preventing the operation of said second register by any of said individual means while said transfer is taking place.

15. In a totalizing system, a plurality of unit value registers, a plurality of ticket issuing machines adapted to issue unit value tickets, each machine having a like plurality of register keys, one key for each of said registers and control keys, means for associating each register with said machines successively and associating all of said registers with each machine successively, and means for each machine controlled by the operation of one of the register keys and a control key thereof for causing the operation of the register corresponding to the operated register key while that register is associated with the machine to register a unit value therein and to control the ticket machine to issue a unit value ticket.

16. In a totalizing system, a plurality of unit-value registers, a plurality of ticket issuing machines adapted to issue unit-value tickets, each machine having a register key for each register and control keys, means comprising a constantly rotating switch associated with each machine for repeatedly and momentarily associating each register with all machines successively and all registers with each machine successively, and means for each machine controlled by the operation of one of the register keys and a control key in the machine for causing the operation of the register corresponding to the operated register key while that register is associated with the machine to register a unit value and to control the machine to issue a unit-value ticket.

17. In a totalizing system, a plurality of unit-value registers, a plurality of ticket issuing machines adapted to issue tickets of a certain unit value, each machine having a register key for each register and a plurality of value keys, means comprising a constantly operating switch associated with each machine for repeatedly and momentarily associating each register with all the machines successively and all of the registers with each machine successively, and means associated with each machine responsive to a single operation of one of said register keys and one of said value keys for causing the operation of the register corresponding to the operated register key a number of times responsive to the repeated association of said corresponding register with the machine to register a number of unit values equivalent in total to the value of the operated value key and to control the ticket machine after each registration to issue a unit-value ticket.

18. In a totalizing system, a ticket issuing machine adapted to issue tickets of a certain unit value, said machine having a plurality of value keys, a "win" key, a "place" key, and a plurality of competitor keys, one for each competitor in a race, a "win" register and a "place" register for each competitor, and means responsive to a single operation of one of said competitor keys, one of said value keys and either said "win" key or said "place" key for selecting the "win" register or "place" register of the competitor corresponding to the operated competitor key according to whether the "win" key or the "place" key is operated, and means for causing the operation of said register a plurality of times to register a number of unit values equivalent in total value to the value key operated and means for operating said machine a plurality of times to issue a corresponding number of unit-value tickets.

19. In a totalizing system, a ticket issuing machine adapted to issue tickets of a certain unit value, said machine having a plurality of keys, one for each competitor in a race and a control key, a plurality of registers, one for each competitor, means controlled by said competitor keys individually and said control key for initiating the operation of the register of the competitor corresponding to the controlling competitor key to register one certain unit value, and means in the register operated coincidental to the initiation of the operation of the register for controlling the operation of said machine to issue a unit-value ticket.

20. In a totalizing system, a ticket issuing machine adapted to issue tickets of a certain unit value, said machine having a plurality of keys, one for each competitor in a race and a control key, a plurality of unit-value registers, one for each competitor, means for momentarily associating said registers with said machine one after another, means controlled by said competitor keys individually and said control key, and effective while the register of the competitor corresponding to the controlling competitor key is associated with said machine to operate that register to register one certain-unit value, means for operating said machine to issue a ticket, in each register and means in each register for controlling the operation of said last means to cause said machine to issue a unit-value ticket coincidental to the registration of a unit value in the register.

21. In a totalizing system, a ticket issuing machine adapted to issue tickets of a certain unit value, said machine having a plurality of keys, one for each competitor in a race and a control key, a plurality of unit-value registers, one for each competitor, a combination relay group associated with said machine for operating said registers, means for momentarily associating said registers with said relay group one after another, a rotary switch adapted to operate said combination relays in a different combination in each of its positions, said switch having a position for each of said competitor keys, means controlled by said competitor keys individually and said control key for operating said switch to its position corresponding to the controlling competitor key to operate said relays in the particular combination for that position to thereby cause the operation of the corresponding competitor register while it is momentarily associated therewith to register a unit value, and means in the machine controlled from the register coincidental to the operation of the register for then operating said machine to issue a unit-value ticket.

22. In a totalizing system, a ticket issuing machine adapted to issue tickets of a certain unit value, said machine having a plurality of keys, one for each competitor in a race and value keys, a plurality of unit-value registers, one for each competitor, a total register, means controlled by said competitor keys individually and one of said value keys for simultaneously starting the operation of said total register and the competitor register corresponding to the controlling competitor key to register a unit-value in each, means for operating the machine to issue a ticket, and means in said total register for causing the operation of said last means to cause said ticket issuing machine to issue a unit value ticket only after the registering operation has been started.

23. In a totalizing system, a plurality of ticket issuing machines adapted to issue tickets of a certain unit value, each machine having a plurality of keys, one for each competitor in a race and a value key, a plurality of unit-value registers, one for each competitor, a group of combination relays associated with each machine, means for momentarily associating each register with all of said relay groups successively and all registers with each relay group successively, means for each machine controlled by the competitor keys thereof individually and by said value key for operating the relays of the group associated with its machine in a combination particular to the controlling competitor key to cause the operation of the corresponding competitor register while it is associated with that relay group to register a unit value therein, and means in each register for operating the machine causing such registration to issue a unit-value ticket only after the proper register is associated therewith.

24. A ticket issuing machine for use in a registering system having equipment for registering each ticket issued, said machine comprising ticket issuing mechanism, means controlled from the machine for transmitting an impulse to the register equipment for operating said equipment to register a ticket, means controlled in the operation of said equipment upon receipt of such impulse for thereafter transmitting an impulse of current over a circuit back to said machine, and a relay energized over the circuit by said last impulse for operating said mechanism to issue a ticket.

25. A ticket issuing machine for use in a registering system provided with equipment operated by an impulse of current from the machine to register a ticket and to transmit an impulse of current back to the machine, said machine having ticket issuing mechanism, means for transmitting an impulse of current to said equipment preparatory to the issue of a ticket to register the ticket in said equipment, means in said equipment operated responsive to the receipt of said impulse for transmitting an impulse back to said machine, and a relay energized by the impulse of current from said equipment for operating said mechanism to issue a ticket.

26. A ticket issuing machine for use in a registering system provided with equipment operated by an impulse of current from the machine to register a ticket and to transmit an impulse of current back to the machine, said machine having ticket issuing mechanism, means for transmitting desired numbers of impulses preparatory to the issue of desired numbers of tickets to operate said equipment to register the desired numbers of tickets, and means operated by each impulse transmitted by said equipment with each registration for operating said mechanism to issue a ticket.

27. A ticket issuing machine for use in a registering system provided with equipment operated by an impulse of current from the machine to register a ticket and to transmit an impulse of current back to the machine, said machine having ticket issuing mechanism, a plurality of control keys, a plurality of number keys, means responsive to a single operation of one of said control keys and one of said number keys for transmitting a number of impulses corresponding to the operated number key to operate said equipment to register a corresponding number of tickets, and means operated by each impulse transmitted by said equipment with the registration of each ticket for operating said mechanism to issue a ticket.

28. A ticket issuing machine for use in a registering system provided with equipment operated by impulses of current from the machine to register tickets, one for each impulse, segregating the registrations according to the kind of ticket, and to transmit an impulse of current to the machine after the registration of each ticket, said machine having mechanism for issuing various kinds of tickets, a key for each kind of ticket, a key for each competitor, a plurality of number keys, means responsive to a single operation of one of said ticket keys, one of said competitor keys and one of said number keys for setting said mechanism to issue tickets of the kind corresponding to the operated ticket and competitor keys and for transmitting a number of impulses corresponding to the number key operated to operate said equipment to register a number of tickets corresponding in number and kind to the operated keys, and means operated by each impulse transmitted by said equipment with each registration for operating said mechanism to issue a ticket of the kind for which it is set.

29. A ticket issuing machine for use in a totalizing system having register equipment for totalizing the number of tickets issued, said machine having means for issuing a ticket, means responsive to an initial operation of the machine for operating said equipment to register the issue of a ticket, a relay in said equipment energized to start the registering operation of the equipment and having means for transmitting an impulse of current back to said machine, said ticket issuing means operated by said impulse to issue a ticket only after the operation of the registering equipment has been started.

30. A ticket issuing machine for use in a totalizing system having a plurality of individual competitor registers for totalizing the number of tickets issued for each competitor, said machine having means for issuing a particular ticket for each competitor, means for setting said issuing means for a particular competitor and for causing the operation of the corresponding competitor register to register the issue of a ticket, a relay common to all said registers energized responsive to the setting of the issuing means for transmitting an impulse of current back to said machine, and a relay in said machine operated in response to said impulse for operating said first means to issue a ticket for said particular competitor.

31. A ticket issuing machine for use in a totalizing system having a register for totalizing the number of tickets issued by the machine, said machine having means for issuing tickets, a register key, a competitor key, a plurality of number keys, means responsive to a single operation of said register and competitor keys and one of said number keys for causing the repeated operation of said register and the operation of said ticket issuing means after each register operation to issue a ticket, and means for stopping the repeated operation of the register and the ticket issuing means when a number of tickets corresponding to the operated number key has been issued.

32. A ticket issuing machine for use in a totalizing system having register equipment for totalizing the number of tickets issued by the machine, said machine having a register key, a competitor key, a plurality of number keys, means for issuing a ticket, means responsive to a single operation of said register and competitor keys and one of said number keys for sending an impulse to said equipment to operate it a number of times corresponding to the number key operated to register a corresponding number of registrations, and means responsive to the receipt of each impulse by said equipment for operating said ticket issuing means to issue a ticket.

33. A ticket issuing machine for use in a totalizing system having a plurality of individual competitor registers for totalizing the number of tickets issued for each competitor, said machine having means for issuing a particular ticket for each competitor, a class key, a key for each competitor, a plurality of number keys, means responsive to a single operation of said class key and one of the competitor keys and one of the number keys for setting said ticket issuing means for issuing tickets of the competitor corresponding to the operated competitor key, said last means causing the operation of the corresponding competitor register a number of times to register a number of ticket issuings corresponding to the number key operated and operating said ticket issuing means after each registration to issue a ticket of said corresponding competitor.

34. A ticket issuing machine for use in a totalizing system having a plurality of individual competitor registers for totalizing the tickets issued for each competitor, said machine having means for issuing a particular ticket for each competitor, a class key, a competitor key for each register, a plurality of number keys, means responsive to the operation of said class key and one of the competitor keys for setting said ticket issuing means for issuing tickets of the competitor corresponding to the operated competitor key and for selecting the corresponding competitor register, means responsive to the operation of one of said number keys for operating the selected register to register the issuing of a ticket and for thereafter operating said ticket issuing means to issue a ticket, and means controlled by the operated number key for reoperating the last two means a number of times until a number of registrations have been made and a number of tickets issued corresponding to the number key operated.

35. A ticket issuing machine adapted to issue tickets of a unit value for use in a totalizing system having an individual register for each competitor in a race, operable by a device common to all the registers responsive to the reception by said device of a signal particular to the register, to totalize the bets for each competitor, said machine having unit-value ticket issuing mechanism, a class key, a competitor key for each register, a plurality of value keys, means operating automatically and repeatedly responsive to a single operation of said class key and one of the competitor keys and one of the value keys for transmitting a number of like signals particular to the operated competitor key to said device to thereby operate the corresponding competitor register for registering a number of unit values equivalent in total to the value represented by the operated value key and for operating said mechanism responsive to each unit-value registration to issue a unit value ticket.

36. A ticket issuing machine for use in a totalizing system having an individual register for each competitor in a race operable by a device common to all the registers, upon receipt of signals particularly for the register, to totalize all bets for each competitor in units of a certain value, said machine having unit-value ticket issuing mechanism, means including a key for each competitor, a value key, and a class key, means responsive to the operation of one of these competitor keys and said other keys for transmitting a signal particular to the operated competitor key to operate said common device and thereby operate the corresponding competitor register to register a unit value, a relay included in said common device energized responsive to such a registration for transmitting an impulse of current back to said machine and means responsive to said impulse for operating said mechanism to issue a unit-value ticket.

37. A ticket issuing machine for use in a totalizing system having equipment for totalizing in units of a certain value the bets placed on each competitor in a race according to class, said machine having means for issuing unit-value tickets for each of a plurality of classes and particular to each competitor, a plurality of class keys, a plurality of competitor keys, one for each competitor, means responsive to an operation of one of the competitor keys and one of said class keys for setting said ticket issuing machine for issuing tickets for the competitor and class corresponding to the keys operated, means for then transmitting an impulse to said equipment to operate said equipment to register a unit-value bet for the competitor corresponding to the operated competitor key and of the class corresponding to the operated class key, and means responsive to the receipt of said impulse by the equipment for operating said ticket issuing means to issue a unit-value ticket of the class and for the competitor for which said means is set.

38. A ticket issuing machine for use in a totalizing system having equipment for totalizing the bets in units of a certain value and according to class placed on each competitor in a race, said machine having mechanism for issuing unit value tickets with class and competitor data thereon, a key for each competitor, a key for each class of bets, means responsive to the operation of one competitor key and one class key for setting said mechanism to issue a ticket with data thereon corresponding to operated class and competitor keys, means also responsive to the operation of said competitor key for then operating said equipment to register a unit value bet for the class and competitor corresponding to the keys operated, and means responsive to the operation of said last means for operating said mechanism to issue a unit value ticket with the data for which it is set.

39. A ticket issuing machine for use in a totalizing system having a plurality of individual competitor registers operable by a device responsive to signals from said machine for totalizing the bets made on each competitor, said machine having means for issuing tickets particular to each competitor but all of the same unit-value bet, a class key, a competitor key for each register, a plurality of value keys, means for transmitting signals to said device, means responsive to the operation of said class key and one of said competitor keys for setting said first means for issuing tickets particular to the competitor corresponding to the operated competitor key and for setting said second means for the transmission of a specific signal for said corresponding competitor, means then responsive to the operation of one of said second keys for operating said signal means to transmit a signal to said device whereby said device operates the corresponding competitor register to register a unit value bet and to thereafter operate said first means to issue a unit-value ticket, and means controlled by said operated value key for reoperating said last two means a number of times to make a number of unit-value registrations and to issue a number of unit-value tickets equivalent in total value to the value represented by the operated value key.

40. A ticket issuing machine for use in a totalizing system having a plurality of individual competitor registers selectively operable by a combination relay group capable of operation in as many combinations as there are registers, said machine comprising a plurality of competitor keys, one for each register, a class key, a rotary switch having a plurality of wipers, circuit connections whereby each competitor key when operated with said class key connects a potential to a particular contact of the banks of one of said wipers, ticket issuing mechanism, an electric motor for driving said wipers in unison over their bank contacts and operating said ticket issuing mechanism, circuit connections including another of said wipers for each relay of said group for operating said relays in a different combination for each position of said switch wipers, means including said motor responsive to the operation of said class key and one of said competitor keys for driving said switch wipers, means responsive to the encountering of the potential on the particular contact of the operated competitor key by said one wiper for stopping said motor, for locking said wipers in position with said one wiper in engagement with said particular contact, and for completing wiper circuit connections to operate said relays in the particular combination for the position of the switch wipers to thereby selectively operate the register corresponding to the operated competitor key by closing a circuit thereto, and means including said motor responsive to the closure of said circuit for operating said mechanism to issue a ticket.

41. In a totalizing system, a ticket issuing machine adapted to issue tickets of a certain value, for any of a plurality of competitors, a series of registers one for each competitor, means responsive to a conditioning operation of the machine for connecting the machine to a particular competitor register and transmitting an impulse of current thereto, means associated with the register for transmitting a revertive impulse back to the machine after the first impulse has been received, and means in the machine responsive to said last impulse for causing a further operation of the machine to issue a ticket.

LANCELOT MARTIN SIMPSON.